United States Patent
Lee et al.

(10) Patent No.: US 8,208,405 B2
(45) Date of Patent: Jun. 26, 2012

(54) INFORMATION ENCODING FOR IMPAIRED OPTICAL PATH VALIDATION

(75) Inventors: Young Lee, Plano, TX (US); Greg Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 289 days.

(21) Appl. No.: 12/708,046

(22) Filed: Feb. 18, 2010

(65) Prior Publication Data

US 2010/0220995 A1    Sep. 2, 2010

Related U.S. Application Data

(60) Provisional application No. 61/156,282, filed on Feb. 27, 2009.

(51) Int. Cl.
*H04L 12/28* (2006.01)
(52) U.S. Cl. .......................... 370/254; 370/392
(58) Field of Classification Search .................. 370/252, 370/254, 255, 392
See application file for complete search history.

(56) References Cited

U.S. PATENT DOCUMENTS

| | | | | |
|---|---|---|---|---|
| 6,940,874 | B2* | 9/2005 | Ruszczyk et al. | 370/516 |
| 7,089,580 | B1* | 8/2006 | Vogel et al. | 725/111 |
| 7,158,515 | B1* | 1/2007 | Wang et al. | 370/392 |
| 2006/0092952 | A1 | 5/2006 | Boutros et al. | |
| 2006/0098587 | A1* | 5/2006 | Vasseur et al. | 370/254 |
| 2006/0176820 | A1* | 8/2006 | Vasseur et al. | 370/241 |
| 2009/0149179 | A1* | 6/2009 | Shim et al. | 455/436 |

FOREIGN PATENT DOCUMENTS

| | | |
|---|---|---|
| CN | 1984452 A | 6/2007 |
| CN | 101019372 A | 8/2007 |
| CN | 101047933 A | 10/2007 |
| WO | 2009056021 A1 | 5/2009 |
| WO | 2009056072 A1 | 5/2009 |

OTHER PUBLICATIONS

Bradner, S., "Key words for use in RFCs to Indicate Requirement Levels," BCP 14, RFC 2119, Mar. 1997.
ITU-T Recommendation G.650.1, "Definitions and test methods for linear, deterministic attributes of single-mode fibre and cable," Jun. 2004.
ITU-T Recommendation G.661, "Definition and test methods for the relevant generic parameters of optical amplifier devices and subsystems," Mar. 2006.

(Continued)

*Primary Examiner* — Hong Cho
(74) *Attorney, Agent, or Firm* — Conley Rose, P.C.; Grant Rodolph; Brandt Howell

(57) ABSTRACT

A network component comprising at least one processor configured to implement a method comprising transmitting a message to at least one adjacent control plane controller, wherein the message comprises a Type-Length-Value (TLV) having a plurality of parameters, wherein the message comprises frequency dependency information for each of the parameters that is frequency dependent. Included is a method comprising communicating a message comprising a TLV to a control plane controller, wherein the TLV comprises a plurality of parameters and frequency dependency information for each of the parameters that is frequency dependent. Also included is an apparatus comprising a control plane controller configured to communicate a TLV to at least one adjacent control plane controller, wherein the TLV indicates a plurality of parameters and frequency dependency information for each of the parameters that is frequency dependent.

20 Claims, 15 Drawing Sheets

OTHER PUBLICATIONS

ITU-T Recommendation G.671, "Transmission characteristics of optical components and subsystems," Jan. 2005.

ITU-T Recommendation G.680, "Physical transfer functions of optical network elements," Jul. 2007.

G. Bernstein, Y. Lee, D. Li, "A Framework for the Control and Measurement of Wavelength Switched Optical Networks (WSON) with Impairments," draft-bernstein-ccamp-wson-impairments-02.txt; Feb. 6, 2009.

Y. Lee, G. Bernstein, "Information Model for Impaired Optical Path Validation," draft-bernstein-wson-impairment-info-01.txt, Feb. 24, 2009.

G. Bernstein, Y. Lee, D. Li, W. Imajuku, "Routing and Wavelength Assignment Information Model for Wavelength Switched Optical Networks," draft-ietf-ccamp-rwa-info-01.txt, Nov. 2008.

G. Bernstein, Y. Lee, D. Li, W. Imajuku, "Routing and Wavelength Assignment Information Encoding for Wavelength Switched Optical Networks," draft-ietf-ccamp-rwa-wson-encode-00.txt, Dec. 2008.

ITU-T Recommendation G.Supplement 39, "Optical system design and engineering considerations," Dec. 2008.

G. Bernstein, et al., "Information Encoding for Impaired Optical Path Validation," draft-bernstein-wson-impairment-encode-01.txt, Jul. 8, 2009.

G. Bernstein, et al., "Information Encoding for Impaired Optical Path Validation," draft-bernstein-wson-impairment-encode-00.txt; Mar. 2, 2009.

G. Bernstein, Y. Lee, D. Li, W. Imajuku, "Routing and Wavelength Assignment Information Model for Wavelength Switched Optical Networks," draft-ietf-ccamp-rwa-info-06.txt, Feb. 8, 2010.

G. Bernstein, Y. Lee, D. Li, W. Imajuku, "Routing and Wavelength Assignment Information Encoding for Wavelength Switched Optical Networks," draft-ietf-ccamp-rwa-wson-encode-03, Oct. 8, 2009.

Strand, J., Ed., et al., "Impairments and Other Constraints on Optical Layer Routing," RFC 4054, May 2005.

T. Otani, et al., "Generalized Labels of Lambda-Switching Capable Label Switching Routers (LSR)," draft-otani-ccamp-gmpls-lambda-labels-02.txt, Nov. 2008.

T. Otani, et al., "Generalized Labels for G.694 Lambda-Switching Capable Label Switching Routers," draft-ietf-ccamp-gmpls-g-694-lambda-labels-02.txt, Jul. 14, 2008.

Y. Lee, Ed., et al., "Information Model for Impaired Optical Path Validation," draft-bernstein-wson-impairment-info-02.txt, Jul. 8, 2009.

Y. Lee, et al., "A Framework for the Control of Wavelength Switched Optical Networks (WSON) with Impairments," draft-ietf-ccamp-wson-impairments-01.txt, Oct. 22, 2009.

Foreign Communication From a Related Counterpart Application, PCT Application PCT/CN2010/070784, International Search Report dated May 27, 2010, 3 pages.

Foreign Communication From a Related Counterpart Application, PCT Application PCT/CN2010/070784, Written Opinion dated May 27, 2010, 8 pages.

* cited by examiner

US 8,208,405 B2

INFORMATION ENCODING FOR IMPAIRED OPTICAL PATH VALIDATION

CROSS-REFERENCE TO RELATED APPLICATIONS

The present application claims priority to U.S. Provisional Patent Application Ser. No. 61/156,282 filed Feb. 27, 2009 by Young Lee, et al. and entitled "Information Encoding for Impaired Optical Path Validation," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) during path computation for the various signals that are being transported through the network at any given time. Unlike traditional circuit-switched and connection-oriented packet-switched networks that merely have to determine a route for the data stream across the network, WDM networks are burdened with the additional constraint of having to ensure that the same wavelength is not simultaneously used by two signals over a single fiber. This constraint is compounded by the fact that WDM networks typically use specific optical bands comprising a finite number of usable optical wavelengths. As such, the RWA continues to be one of the challenges in implementing WDM technology in optical networks.

Path computations can also be constrained due to other issues, such as excessive optical noise, along the lightpath. An optical signal that propagates along a path may be altered by various physical processes in the optical fibers and devices, which the signal encounters. When the alteration to the signal causes signal degradation, such physical processes are referred to as "optical impairments." Optical impairments can accumulate along the path traversed by the signal and should be considered during path selection in WSONs to ensure signal propagation, e.g. from an ingress point to an egress point, with an acceptable amount of degradation.

SUMMARY

In one embodiment, the disclosure includes a network component comprising at least one processor configured to implement a method comprising transmitting a message to at least one adjacent control plane controller, wherein the message comprises a Type-Length-Value (TLV) having a plurality of parameters, wherein the message comprises frequency dependency information for each of the parameters that is frequency dependent.

In another embodiment, the disclosure includes a method comprising communicating a message comprising a TLV to a control plane controller, wherein the TLV comprises a plurality of parameters and frequency dependency information for each of the parameters that is frequency dependent.

In yet another embodiment, the disclosure includes an apparatus comprising a control plane controller configured to communicate a TLV to at least one adjacent control plane controller, wherein the TLV indicates a plurality of parameters and frequency dependency information for each of the parameters that is frequency dependent.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
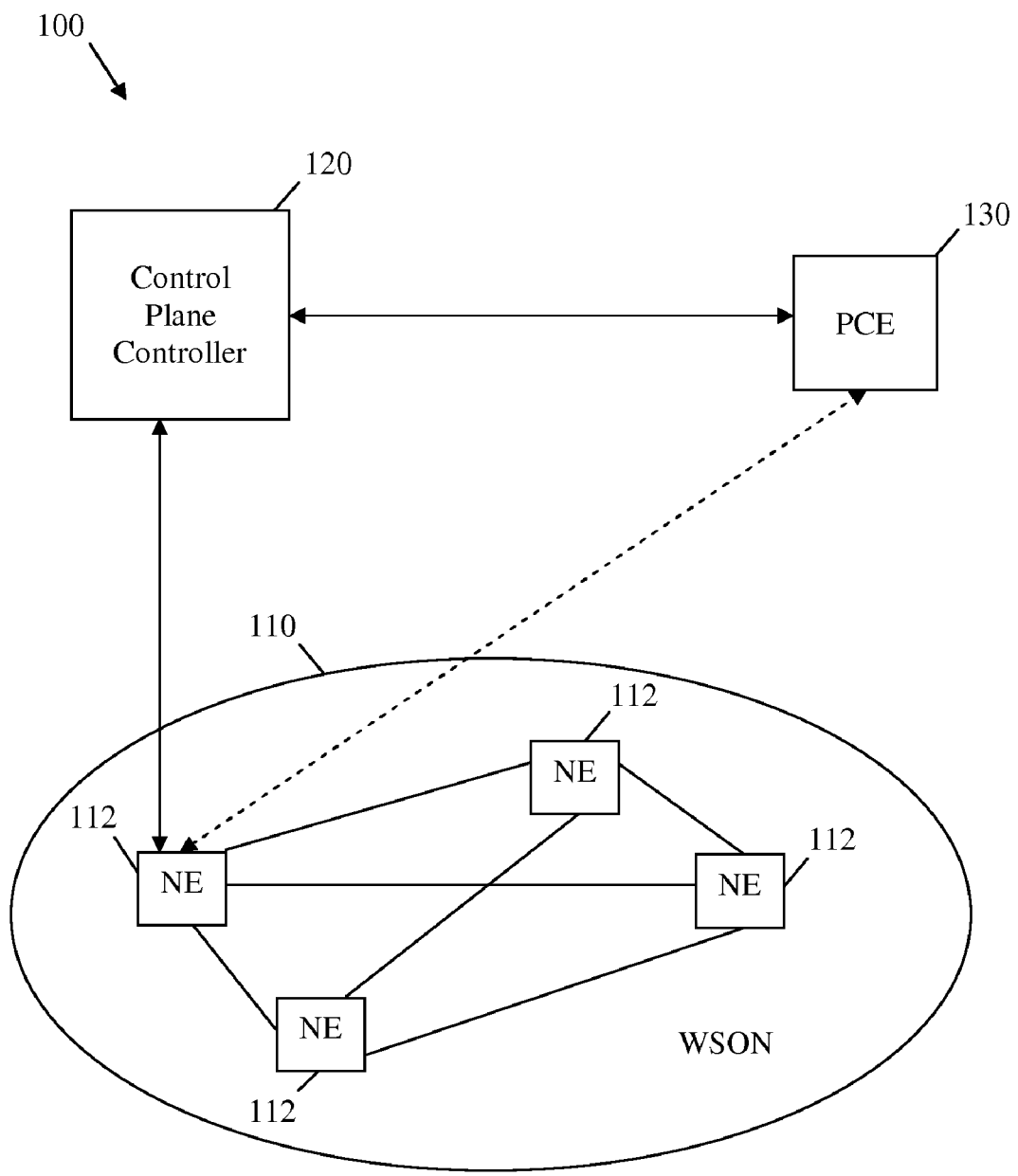
FIG. 1 is a schematic diagram of an embodiment of a WSON system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To ensure proper operations in optical networks, a plurality of network components (e.g. NEs, subsystems, devices, cabling, etc.) may be characterized at a detailed level. The detailed characteristics of such network components may be considered during network planning, installation, and turn-up phases. Additionally, the network component characteristics may be used during day-to-day operations, such as for computing and establishing lightpaths and monitoring connections. The detailed characteristics may comprise optical impairment due to physical processes in the components.

Disclosed herein are encoding formats for information/parameters used in path computation and/or optical path impairment validation. This encoding is based on International Telecommunication Union (ITU) Telecommunication Standardization Sector (ITU-T) defined optical network element characteristics as given in ITU-T recommendation G.680 and related specifications. This encoding is intentionally compatible with a previous impairment free optical information encoding used in optical path computations and wavelength assignment.

The units for the various parameters include gigahertz (GHz), decibels (dB), decibels per milliwatt (dBm), milliseconds (ms), picoseconds (ps), and ps/nanometer (nm). These are typically expressed as floating point numbers. Due to the measurement limitations inherent in these parameters, single precision floating point, e.g., 32 bit Institute of Electrical and Electronics Engineers (IEEE) floating point, numbers should be sufficient, but are not required.

Optical impairments may be characterized into three groups: (a) those that apply to the network element as a whole, (b) those that can vary on a per port basis for a network element, and (c) those that can vary based on ingress to egress port pairs. In addition, some parameters may also exhibit frequency dependence. For realistic optical network elements, per port and port-to-port parameters typically only assume a few different values. For example, the channel gain of a reconfigurable optical add/drop multiplexer (ROADM) is usually specified in terms of input-to-drop, add-to-output, and input-to-output. This implies that many port and port-to-port parameters could be efficiently specified, stored and transported by making use of a Link Set TLV (or sub-TLV) and/or a Connectivity Matrix TLV (or sub-TLV) as described herein. However, whether such facilities are used is dependent upon the specific protocol context, e.g., open shortest path first (OSPF), Intermediate System-Intermediate System (IS-IS), etc.

In a TLV structure, the type and length fields form a "header" of sorts. From the type field the following may be inferred: 1) units of the parameter (e.g., dB, dBm, GHz, ps, etc.); 2) the grouping of the parameters (e.g., maximum and minimum values may be grouped); and 3) whether the parameter may exhibit frequency dependency. The encoding described herein provides a compact way to provide optical impairment parameters. In addition, the frequency range of such parameters may be represented. Further, frequency dependent impairment parameters may be differentiated from frequency independent impairment parameters. Moreover, chromatic dispersion may be encoded using an interpolation technique.

In at least some embodiments, the encoding described herein may be implemented with methods and systems for extending a path computation element (PCE) protocol (PCEP) to support Impairment aware RWA (IA-RWA) in optical networks, such as WSONs. The IA-RWA may be managed at a control plane of the network. A plurality of network protocols, such as the PCEP and Generalized Multi-Protocol Label Switching (GMPLS), may be used to perform impairment aware path computation based on the network component characteristics and the expected impact of impairments on light propagation. A plurality of architectures may be used to implement IA-RWA in the network, which may comprise combined routing, wavelength assignment (WA), and impairment validation (IV) architectures, separate routing, WA, and IV architectures, and a distributed WA and IV architecture.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any quantity of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112 may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical cross connects (OXCs), photonic cross connects (PXCs), optical add/drop multiplexers (OADMs), type I or type II ROADMs, wavelength selective switches (WSSs), fixed optical add/drop multiplexers (FOADMs), or combinations thereof.

The NEs 112 may be coupled to each other via optical fibers. The optical fibers may be used to establish optical links and transport the optical signals between the NEs 112. The optical fibers may comprise standard single mode fibers (SMFs) as defined in the ITU-T standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference. The network layer where the NEs 112 operate and communicate may be referred to as the transport plane.

The control plane controller 120 may coordinate activities within the WSON 110. Specifically, the control plane controller 120 may receive optical connection requests and provide lightpath signaling to the WSON 110 via Multiprotocol Label Switching Traffic Engineering (MPLS-TE) or GMPLS, thereby coordinating the NEs 112 such that data signals are routed through the WSON 110 with little or no contention. In addition, the control plane controller 120 may communicate with the PCE 130 using PCEP to provide the PCE 130 with information that may be used for the path computation, and/or receive the path computation from the PCE 130 and forward the path computation to the NEs 112. The control plane controller 120 may be located in a component outside of the WSON 110, such as an external server, or may be located in a component within the WSON 110, such as a NE 112. The network layer where the control plane controller 120 operates may be referred to as the control plane, which may be separated from and may manage the transport plane.

The PCE 130 may perform all or part of the RWA for the WSON system 100, e.g. at the control plane. Specifically, the PCE 130 may receive the wavelength or other information that may be used for the RWA from the control plane controller 120, from the NEs 112, or both. The PCE 130 may process the information to obtain the RWA, for example by computing the routes or lightpaths for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the PCE 130 may receive a path computation request from a path computation client (PCC). The PCC may be any client application requesting a path computation to be performed by the PCE 130. The PCC may also be any network component that makes such a request, such as the control plane controller 120, or any NE 112, such as a ROADM or a FOADM. Generally, the PCC communicates with the PCE 130 using PCEP, although other acceptable communication protocols may be used as well.

There may be many types of path computation constraints that can affect the path computation at the PCE 130. The patch computation constraints may be included in the path computation request by the PCC. In one embodiment, the path computation constraints include optical quality constraints. Examples of such include the optical signal-to-noise ratio (OSNR), amplifier spontaneous emission (ASE), polarization mode dispersion (PMD), polarization-dependent loss (PDL), coherent optical crosstalk, incoherent optical crosstalk, effective pass-band, gain non-uniformity, gain transients, chromatic dispersion, or combinations thereof. In some embodiments, the path computation constraints may be classified as linear in that their effects are independent of the optical signal power and they affect the wavelengths individually. Alternatively, the path computation constraints may be classified as nonlinear in that their effects are dependent of the optical signal power, generate dispersion on a plurality of wavelength channels, induce crosstalk between wavelength channels, or combinations thereof. Regardless, the path computation constraints may be communicated to the PCE 130 so that the PCE 130 may consider them when computing a signal's path through the WSON 100.

The path computation information used in the WSON system 100 may also comprise impairment information, which may be used to perform IA-RWA in the WSON 110. For instance, the PCE 130 may perform all or part of IV for the WSON system 100, which may comprise validating a computed path based on any impairment in the path that may degrade a propagated optical signal. When optical impairments accumulate along a path propagated by an optical signal, the impairments may degrade the signal, which may decrease a bit error rate (BER) of the signal or even lead to failure in detecting or demodulating the signal. The path may be validated if the BER of the signal (or any other measure of signal quality) due to optical impairments may be acceptable or tolerated and the signal may be detected with sufficient accuracy. However, if the BER of the signal is substantially low due to optical impairments, the path may be rejected or excluded from the allowed paths.

The optical impairments may be influenced by physical processes or conditions of the network components, such as the type of fiber, the types and locations of NEs 112, the presence of other optical signals that may share a fiber segment along the signal's path, or combinations thereof. The optical impairments and the physical processes that may cause such impairments are described in a plurality of optical communications references, such as the Internet Engineering Task Force (IETF) Request for Comments (RFC) 4054, which is incorporated herein by reference as if reproduced in its entirety. Optical impairments are also described by Govind P. Agrawal in "Fiber-Optic Communications Systems," published by Wiley-Interscience, 2002, and in "Nonlinear Fiber Optics," published by Academic Press, 2007, both of which are incorporated herein by reference.

Optical impairments may be ignored in some networks, where every path may be valid for the permitted signal types in the network. In this case, optical impairments may be considered during network design and then ignored afterwards, e.g. during path computation. However, in other networks, e.g. larger networks, it may not be practical to limit the allowed paths for each signal type. Instead, IV may be performed for a plurality of paths using approximation techniques, such as link budgets and dispersion (rise time) budgets, e.g. during path computation. Approximation techniques for IV are described in a plurality of optical references, including ITU-T G.680 and ITU-T series G supplement 39 (G.Sup39), both of which are is incorporated herein by reference. The approximation techniques for IV may be based on impairment models and may be used to approximate or estimate impairments due to network components (such as NEs), e.g. at the control plane level. For instance, approximated IV may comprise determining which paths may have an acceptable BER or OSNR for a signal type. In some cases, IA-RWA may be improved in the network by combining approximated IV with RWA, e.g. at a PCE, as described below.

In some cases, impairment effects may require accurate estimation, such as for the evaluation of impairment impact on existing paths prior to the addition of a new path. A plurality of methods may be used for accurate or detailed IV, such as methods based on solving a plurality of partial differential equations that describe signal propagation in a fiber. The methods may also comprise using detailed models for the network components. The estimation/simulation time of such methods may depend on the situation or condition in the network. A significant amount of time may be needed to validate or qualify a path using detailed IV. To increase the probability of validating a path, approximated IV may be performed before the detailed IV. Since detailed IV may be based on estimation/simulation methods that may be substantially different than the RWA methods, the detailed IV process may be separated from the RWA process, e.g. using a separate IV entity or a separate PCE.

Some path computation information, such as RWA information, may be shared without restrictions or constraints between the path computation entities, e.g. between a PCE and a PCC or between PCEs. However, in some cases, the impairment information may be private information and may not be shared between different vendors of different components in the network. For instance, the impairment information may not be shared if some proprietary impairment models are used to validate paths or a vendor chooses not to share impairment information for a set of NEs. For example, in a network that comprises a line segment that corresponds to a first vendor and traverses through a plurality of NEs (e.g. OADMs, PXCs, etc.) that correspond to a plurality of second vendors, the impairment information for the line segment may be private and may not be shared with the second vendors. However, the impairment information for the second vendors may be public and may be shared with the first vendor.

In an embodiment, to maintain impairment information of a first vendor equipment private, the first vendor equipment may provide a list of potential paths to a first PCE in the network, which may consider the list for path computation between an ingress node and an egress node. The list of paths may also comprise wavelength constraints and possibly shared impairment information, e.g. for the first vendor and at least a second vendor. The list may then be sent to a second PCE in the network to perform IA-RWA. However, in relatively larger networks, the list of paths may be substantially large, which may cause scaling issues. In another embodiment, the first vendor equipment may comprise a PCE-like entity that provides the list of paths to a PCE in the network in charge of IA-RWA. The PCE-like entity may not perform RWA and therefore may not require knowledge of wavelength availability information. This approach may reduce the scaling issues due to forwarding substantially large lists. In another embodiment, the first vendor equipment may comprise a PCE, which may be configured to perform IA-RWA, e.g. on behalf of the network. This approach may be more difficult to implement than the other approaches but may reduce the amount of information exchanged and the quantity of path computation entities involved.

Further, a plurality of IV schemes may be used for IA-RWA, e.g. based on different detail levels and/or different architectures. For instance, the IA-RWA process may comprise IV for candidate paths, where a set of paths (e.g. between two nodes) may be validated in terms of acceptable optical impairment effects. Thus, the validated paths may be provided with associated wavelength constraints. The paths and the associated wavelengths may or may not be available in the network when provided, e.g. according to the current usage state in the network. The set of paths may be provided in response to a received request for at most K (where K is an integer) valid paths between two nodes. The set of paths may be provided without disclosing private impairment information about a vendor's equipment. Additionally or alternatively, the IA-RWA process may comprise detailed IV (IV-Detailed), where a validation request for a path and an associated wavelength may be submitted. The path and the associated wavelength may then be validated and a response may be provided accordingly. Similar to the case of IV for candidate paths, the IV response may not disclose impairment information about the vendor's equipment.

Alternatively, the IA-RWA process may comprise distributed IV, where approximated impairment degradation measures may be used, such as OSNR, differential group delay (DGD), etc. The approximated measures may be carried through and accumulated along a path, e.g. using GMPLS or other signaling protocol. When the accumulated measures reach a destination node, a final decision may be made about the path validity. This approach may require disclosing impairment information about a vendor's equipment, e.g. along the path.

Figure 2:
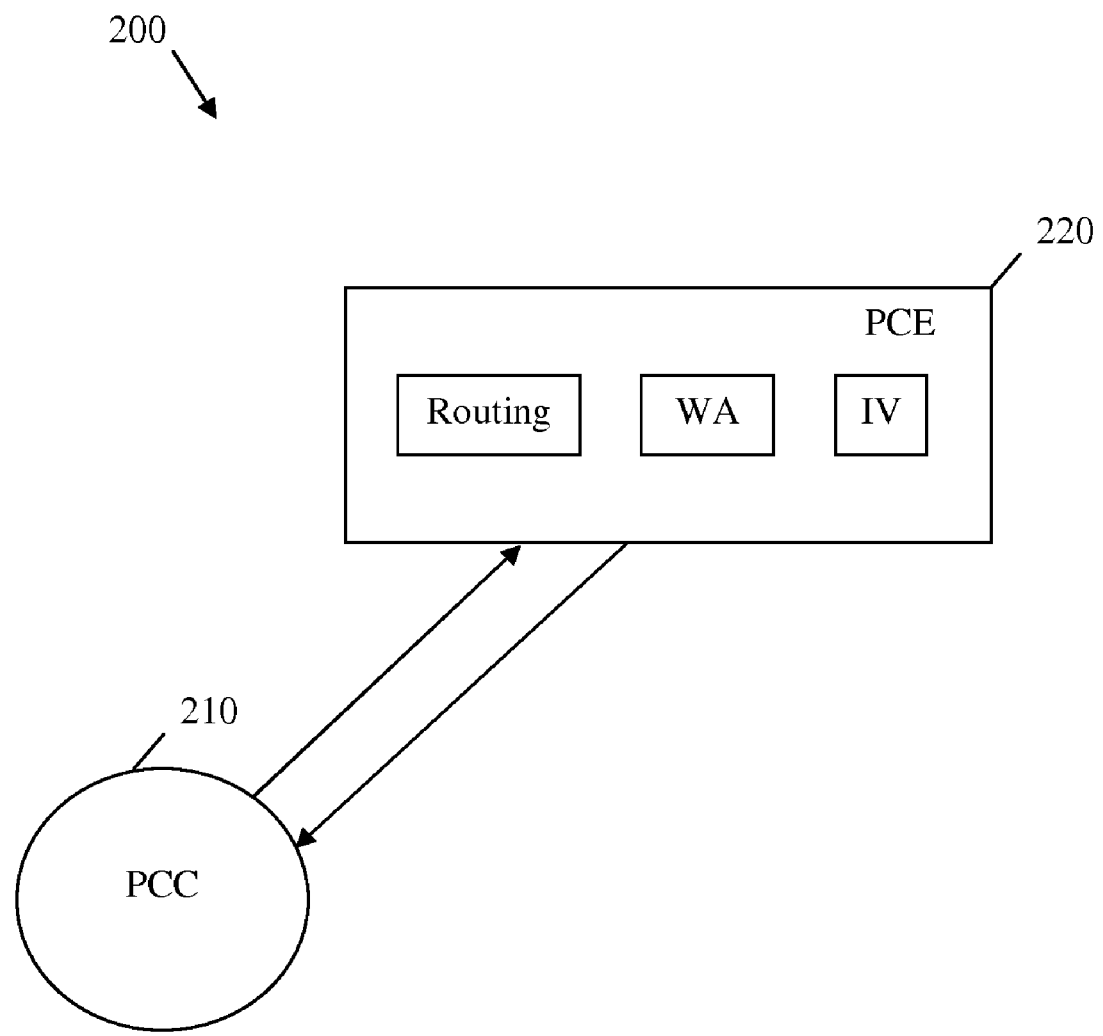
FIG. 2 is a schematic diagram of an embodiment of a combined impairment aware RWA architecture.

A plurality of IA-RWA architectures may be used in optical networks, e.g. WSONs, to perform routing, WA, and IV. FIG. 2 illustrates an embodiment of a combined IA-RWA architecture 200. In the combined IA-RWA architecture 200, a PCC 210 may send a path computation request, which may comprise path computation information, to a PCE 220. The path computation request may comprise RWA information and the PCE 220 may have previous knowledge of shared impairment information, e.g. for a plurality of vendors' equipment. However, the PCE 220 may request additional impairment information, such as non-shared impairment information for any additional vendor's equipment. The PCE 220 may then perform combined routing, WA, and IV using the RWA information and the impairment information. The PCE 220 may use a single computation entity, such as a processor, to perform the combined IA-RWA. For example, the processor may process the RWA information and the impairment information using a single or multiple algorithms to compute the lightpaths, to assign the optical wavelengths for each lightpath, and to validate the lightpaths. Alternatively, the PCE 220 may use a plurality of processors to compute and validate the lightpaths and assign the wavelengths.

During the IA-RWA process, the PCE 220 may perform approximated IV or detailed IV to validate the lightpaths, as described above. Further, the PCE 220 may perform IV before RWA. As such, the PCE 220 may generate first a list of candidate and valid paths in terms of acceptable impairment effects, and then perform RWA to provide computed paths based on the list. Alternatively, the PCE 220 may perform RWA before IV, where a list of computed paths may be first obtained and where then each path may be validated based on impairment information.

The amount of RWA information and impairment information needed by the PCE 220 to compute the paths may vary depending on the algorithm used. If desired, the PCE 220 may not compute the paths until sufficient network links are established between the NEs or when sufficient RWA information and impairment information about the NEs and the network topology is provided. The PCE 220 may then send the computed paths, and the wavelengths assigned to the paths, to the PCC 210. The PCE response may not disclose impairment information about a vendor's equipment. The combined IA-RWA architecture 200 may improve the efficiency of IA-RWA, and may be preferable for network optimization, smaller WSONs, or both.

Figure 3:
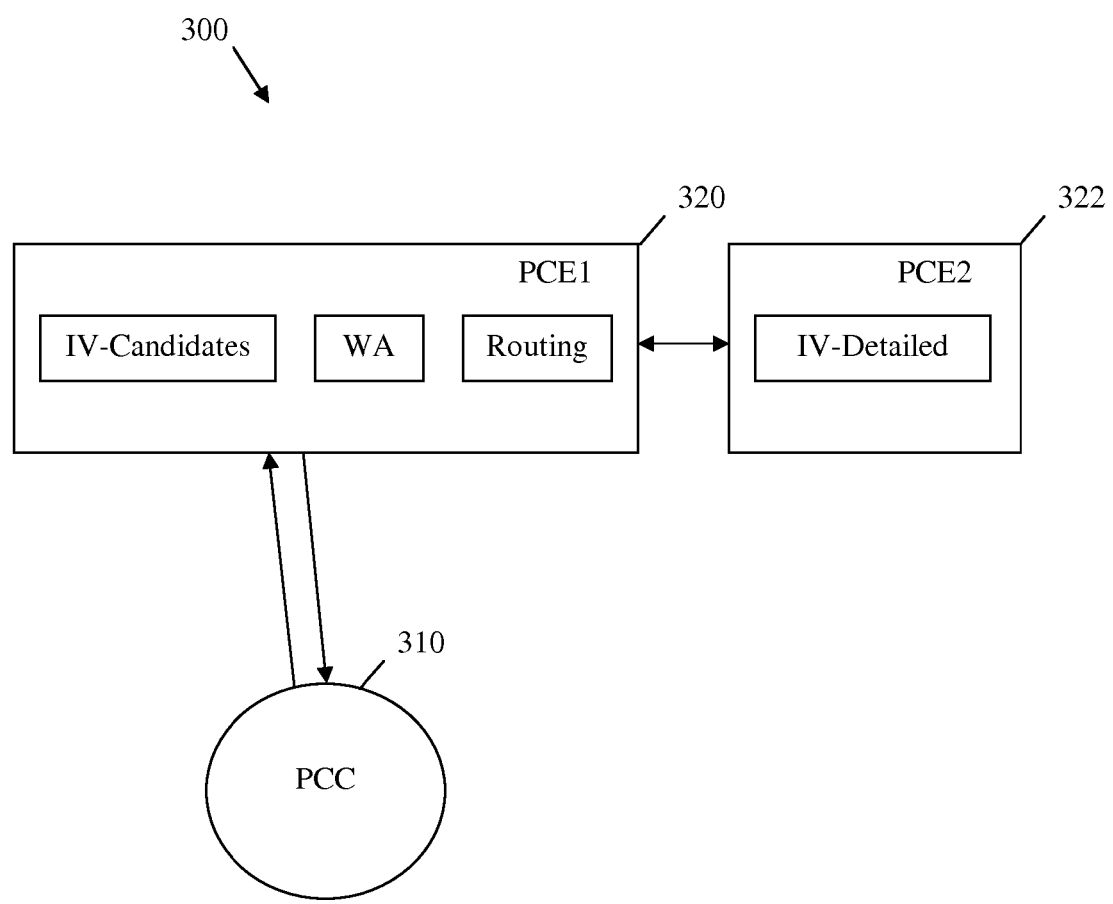
FIG. 3 is a schematic diagram of another embodiment of a combined impairment aware RWA architecture.

FIG. 3 illustrates an embodiment of another combined IA-RWA architecture 300. In the combined IA-RWA architecture 300, a PCC 310 may send a path computation request to a first PCE 320. The first PCE 320 may be configured to perform routing, WA, and IV for candidate paths (IV-Candidates). The first PCE 320 may use the RWA information in the path computation request to perform a combined IA-RWA. The first PCE 320 may have previous knowledge of shared impairment information for a plurality of vendors' equipment but may request additional impairment information, such as non-shared impairment information for any additional vendor's equipment. The impairment information may comprise a set of K paths, e.g. between a source node and a destination node, and a plurality of wavelengths associated with the paths. The first PCE 320 may generate a set of validated paths based on the impairment information, e.g. using IV approximation techniques. The first PCE 320 may perform RWA based on the generated set of validated paths. The first PCE 320 may then send a list of computed and validated paths and assigned wavelength to a second PCE 322 (or IV entity), which may be configured to perform detailed IV (IV-Detailed).

The second PCE 322 may have previous knowledge of impairment information that may not be shared with the first PCE 320 and may use the impairment information to validate the paths. Additionally, the second PCE 322 may request additional impairment information, such as non-shared impairment information for any additional vendor's equipment. Thus, the second PCE 322 may validate each computed path and return a final list of validated paths to the first PCE 320, which may then forward the list to the PCC 310. The final list of validated paths may not comprise the private impairment information.

In an alternative embodiment, the first PCE 320 may communicate with the second PCE 322 as many times as needed to check the validity of each computed path. For instance, the first PCE 320 may send a validation request for each computed path to the second PCE 322, and the second PCE 322 may return a positive or negative response for each request to the first PCE 320, based on the outcome of a detailed IV process. As such, the first PCE 320 may not obtain any private impairment information in the response from the second PCE 322.

The combined IA-RWA architecture 300 may be used in the case where the first PCE 320, the second PCE 322, or both may access private impairment information about a vendor's equipment but may not share it. Further, separating the IV process into an initial approximated IV and a subsequent detailed-IV between the first PCE 320 and the second PCE 322 may improve the efficiency and precision of IA-RWA.

Figure 4:
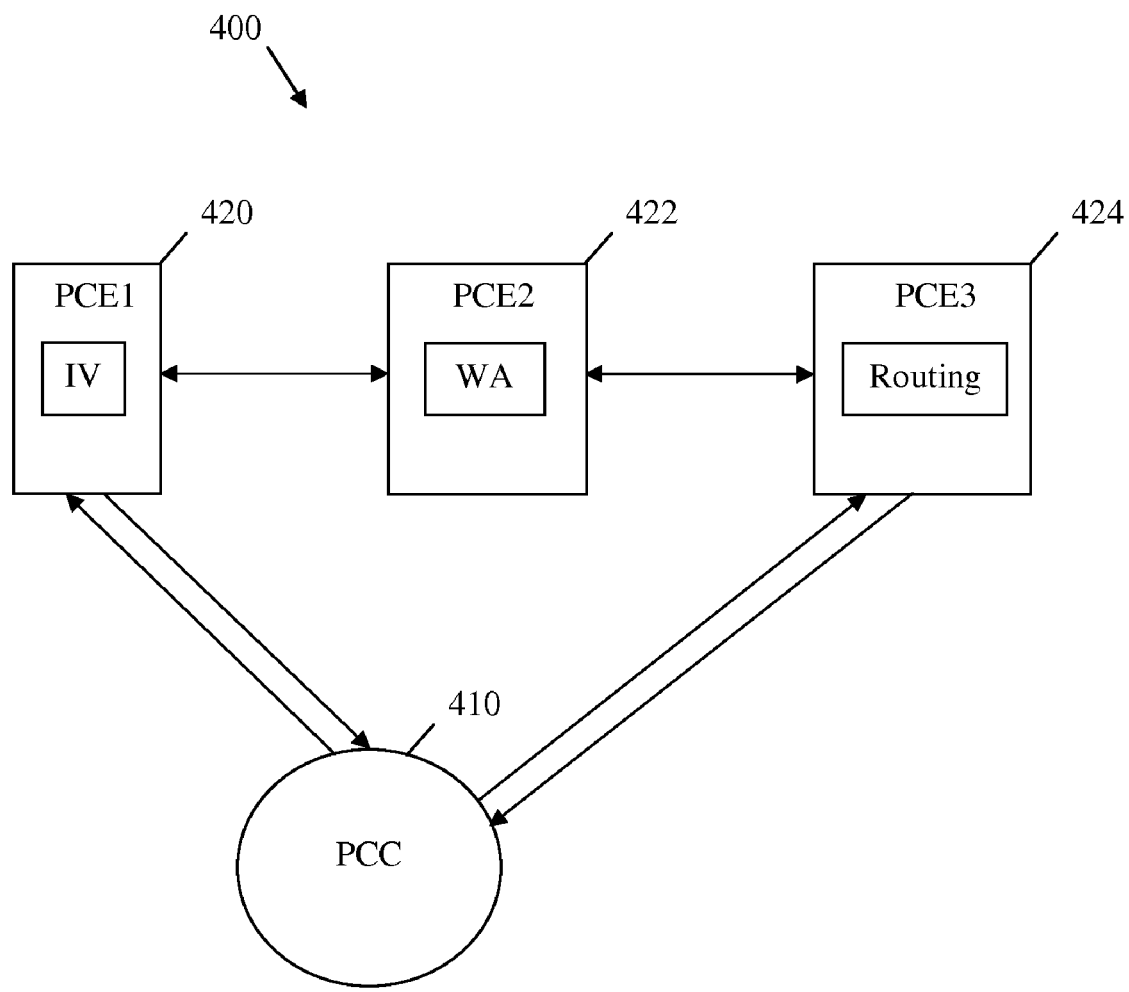
FIG. 4 is a schematic diagram of an embodiment of a separated impairment aware RWA architecture.

FIG. 4 illustrates an embodiment of a separated IA-RWA architecture 400. In the separated IA-RWA architecture 400, a PCC 410 may send a path computation request to a first PCE (or IV entity) 420, which may be configured to perform IV using approximate or detailed techniques/models. The first PCE 420 may have previous knowledge of shared impairment information for a plurality of vendors' equipment but may obtain additional impairment information, such as non-shared impairment information for any additional vendor's equipment. The first PCE 420 may use the impairment information and possibly a set of available wavelengths in the path computation request to generate a list of validated paths. For instance, the impairment information may comprise a set of about K paths, e.g. between a source node and a destination node, and a plurality of wavelengths associated with the paths. The first PCE 420 may generate a set of validated paths based on the impairment information. The first PCE 420 may send the list of paths and the associated wavelengths to the second PCE 422, e.g. without sharing the impairment information with the second PCE 422 or any other PCE.

The second PCE 422 may be configured to assign wavelengths to the paths provided by the first PCE 420 and may then send the list of paths to a third PCE 424, which may be configured for routing assignments. The third PCE 424 may receive the path computation information from the PCC 410 and perform path computation using the information from the PCC 410 and the information from the first PCE 420 and second PCE 422 to obtain a plurality of computed and validated paths and corresponding wavelengths. The third PCE 424 may then send the computed paths and assigned wavelengths to the PCC 410.

In an alternative embodiment, the third PCE 424 may receive the path computation request from the PCC 410 and generate a list of computed paths and corresponding wavelengths, which may be sent to the second PCE 422. The second PCE 422 may assign wavelengths to the paths and communicate the list of paths and wavelengths to the first PCE 420 to validate each path. For instance, the first PCE 420 may send a positive or negative response for each computed path, e.g. without sharing private impairment information. Finally, the validated paths and associated wavelength may be sent to the PCC 410, via any of the PCEs.

Figure 5:
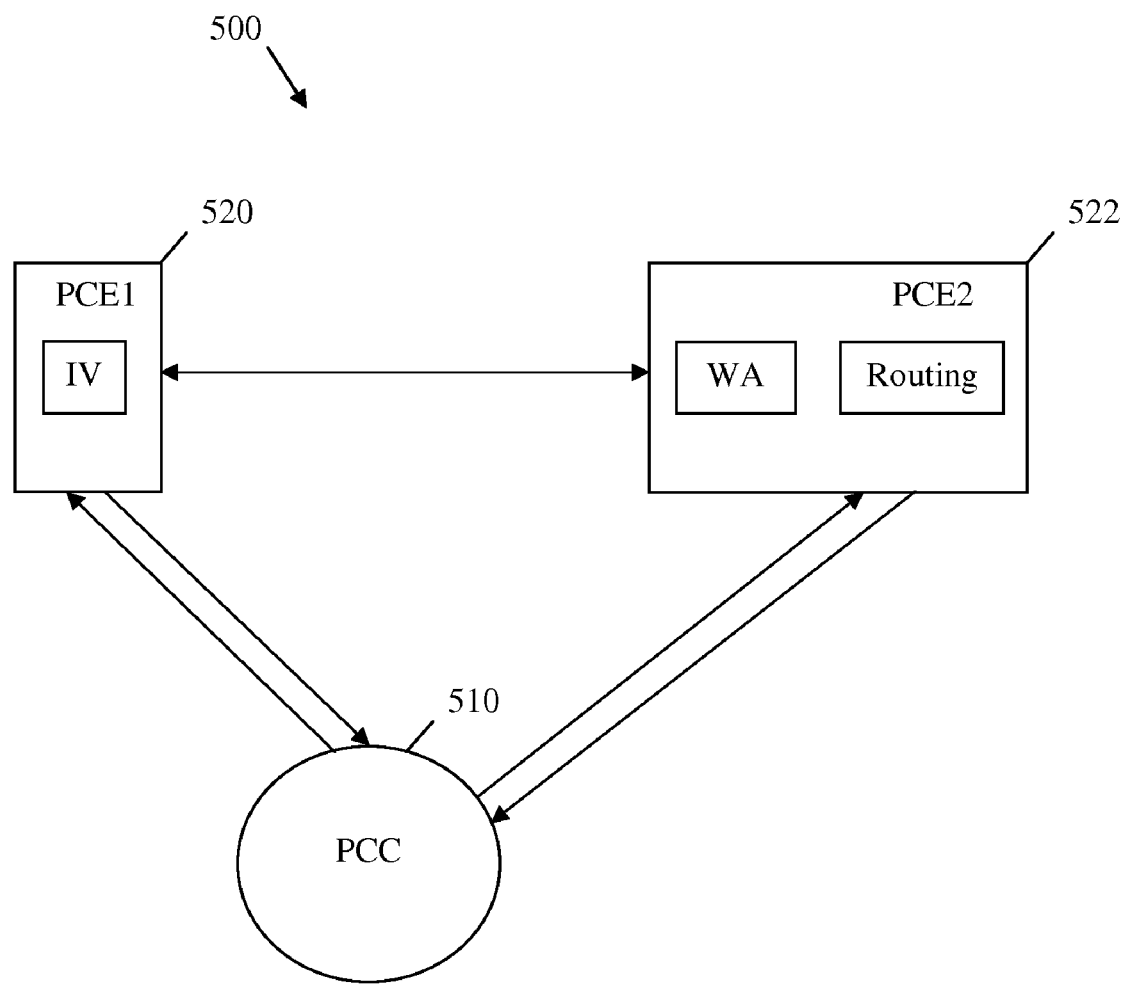
FIG. 5 is a schematic diagram of another embodiment of a separated impairment aware RWA architecture.

FIG. 5 illustrates an embodiment of another separated IA-RWA architecture 500. In the separated IA-RWA architecture 500, a PCC 510 may send a path computation request to a first PCE (or IV entity) 520, which may be configured to perform IV using approximate or detailed techniques/models and send a list of validated paths and corresponding wavelengths to a second PCE 522, e.g. in a manner similar to the separated IA-RWA architecture 400. However, the second PCE 522 may be configured to perform combined RWA, e.g. using a shared processor or dedicated processors. Thus, the second PCE 522 may receive the path computation information from the PCC 510 and perform path computation using the information from the PCC 510 and the information from the first PCE 520 to obtain a plurality of computed and validated paths and corresponding wavelengths. The second PCE 522 may then send the computed paths and assigned wavelengths to the PCC 510. Separating the IV process and the RWA process between the first PCE 520 and the second PCE 522 may be advantageous since the two different processes may be offloaded as such to two separate and specialized processing entities, which may improve computation efficiency.

In an alternative embodiment, the second PCE 522 may receive the path computation request from the PCC 510 and generate a list of computed paths and corresponding wavelengths. The second PCE 522 may then communicate the list of paths and wavelengths to the first PCE 520 to validate each path. For instance, the first PCE 520 may send a positive or negative response for each computed path, e.g. without sharing private impairment information. Finally, the validated paths and associated wavelength may be sent to the PCC 510, via any of the PCEs.

Figure 6:
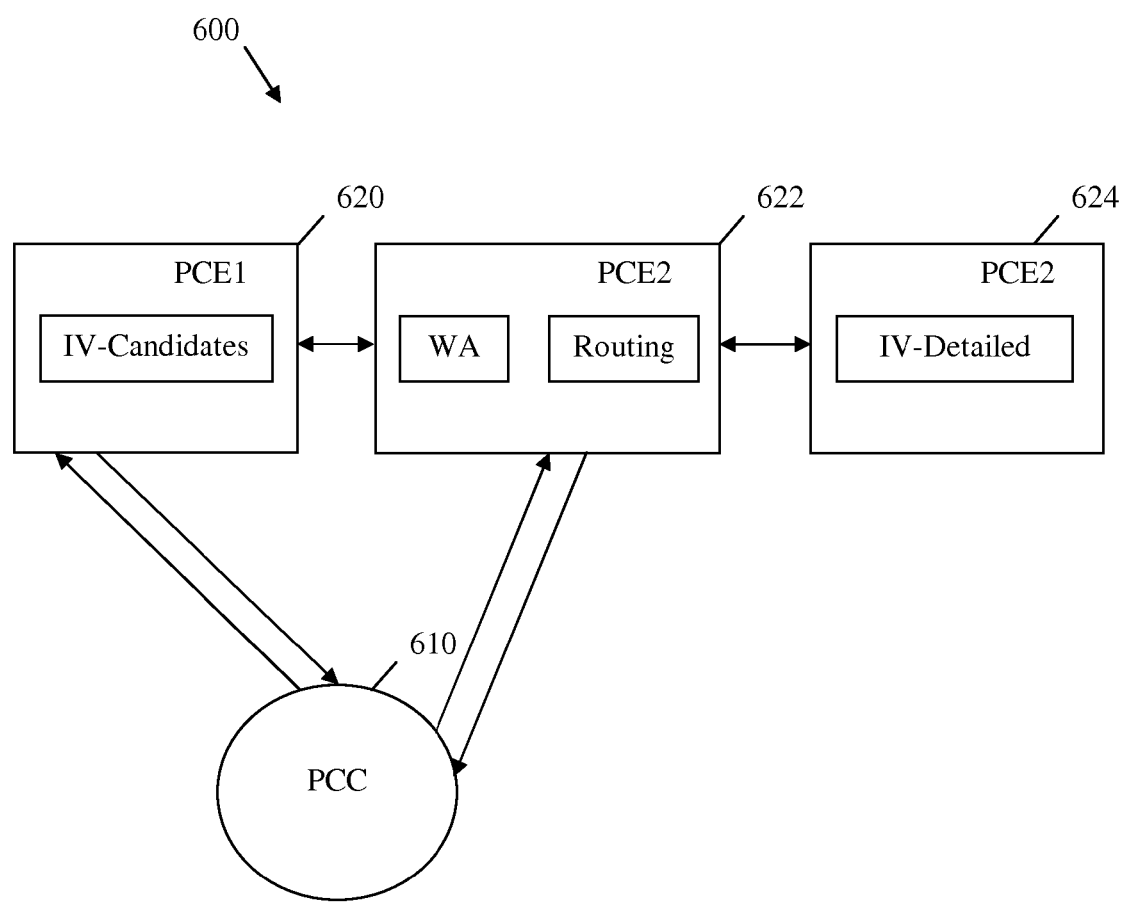
FIG. 6 is a schematic diagram of another embodiment of a separated impairment aware RWA architecture.

FIG. 6 illustrates an embodiment of another separated IA-RWA architecture 600. In the separated IA-RWA architecture 600, a PCC 610 may send a path computation request to a first PCE (or IV entity) 620, which may be configured to perform IV for candidate paths. The first PCE 620 may have previous knowledge of shared impairment information for a plurality of vendors' equipment but may request additional impairment information, such as non-shared impairment information for any additional vendor's equipment. The first PCE 620 may use the impairment information, and possibly a set of available wavelengths in the path computation request, to generate a list of validated paths. For instance, the impairment information may comprise a set of about K paths, e.g. between a source node and a destination node, and a plurality of wavelengths associated with the paths. The first PCE 620 may generate a set of validated paths based on the impairment information, e.g. using IV approximation techniques. The first PCE 620 may send the list of paths and the associated wavelengths to the second PCE 622. However, the first PCE 620 may not share the impairment information with the second PCE 622.

The second PCE 622 may be configured to perform combined RWA, e.g. using a shared processor or dedicated processors. The second PCE 622 may receive the path computation information from the PCC 610 and perform path computation using this information and the information from the first PCE 620 to obtain a plurality of computed and validated paths and corresponding wavelengths. The second PCE 622 may then send a list of computed and validated paths and assigned wavelength to a third PCE (or IV entity) 624, which may be configured to perform detailed IV.

The third PCE 624 may have previous knowledge of impairment information that may not be shared with the second PCE 622 and may use the impairment information to validate the paths. Additionally, the third PCE 624 may request additional impairment information, such as non-shared impairment information for any additional vendor's equipment. Thus, the third PCE 624 may validate each computed path and return a final list of validated paths to the second PCE 622. The second PCE 622 or the first PCE 620 may then forward the final list to the PCC 610. The final list of validated paths may not comprise the private impairment information.

In an alternative embodiment, the second PCE 622 may communicate with the third PCE 624 as many times as needed to check the validity of each computed path. For instance, the second PCE 622 may send a validation request for each computed path to the third PCE 624, and the third PCE 624 may return a positive or negative response to the second PCE 622, based on the outcome of a detailed IV process. As such, the second PCE 622 may not obtain any private impairment information in the response from the third PCE 624.

The combined IA-RWA architecture 600 may be used in the case where the first PCE 620 and/or the third PCE 624, but not the second PCE 622, may access private impairment information about a vendor's equipment but may not share it. Further, separating the IV process into an initial approximated IV and a subsequent detailed IV between the first PCE 620 and the third PCE 624 may improve the efficiency and precision of IA-RWA.

Figure 7:
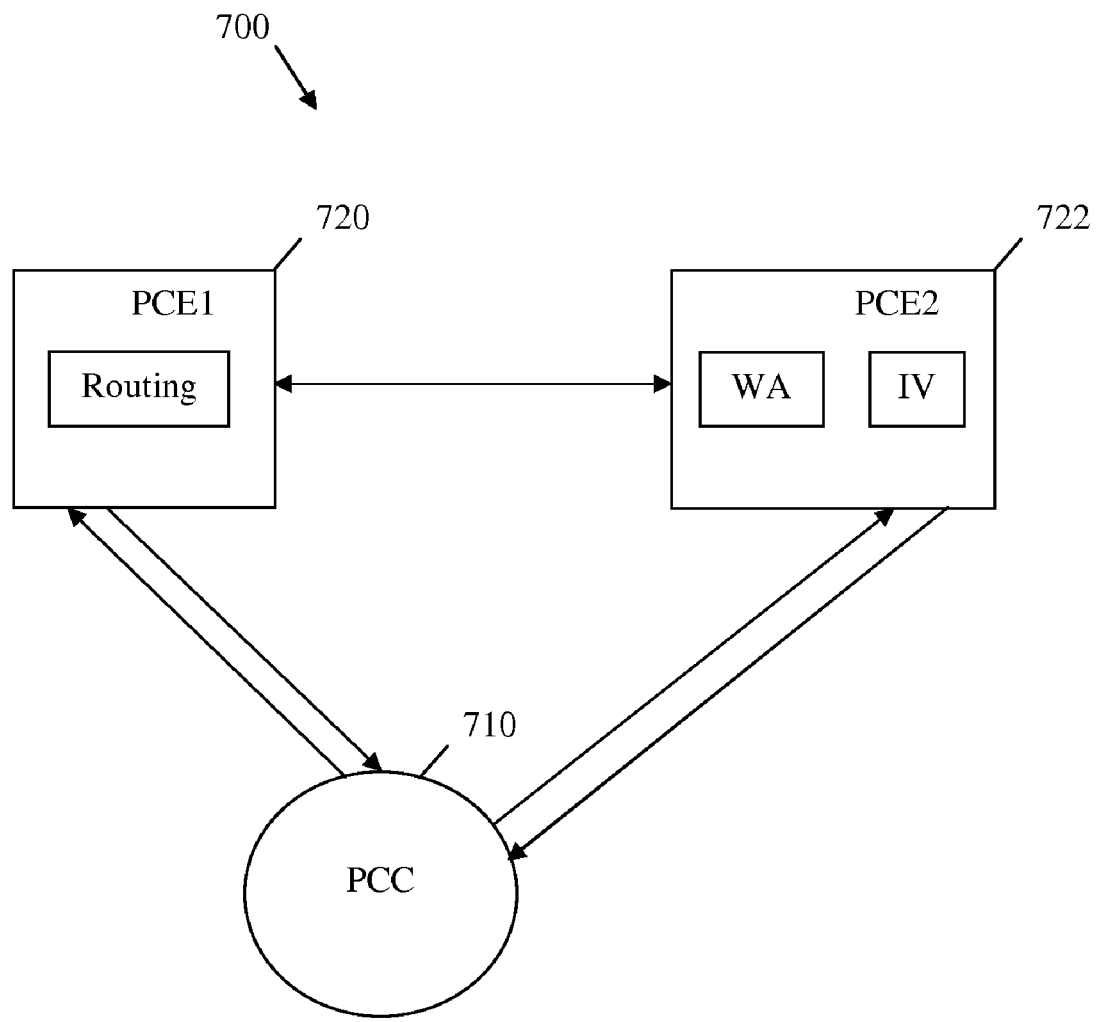
FIG. 7 is a schematic diagram of another embodiment of a separated impairment aware RWA architecture.

FIG. 7 illustrates an embodiment of another separated IA-RWA architecture 700. In the separated IA-RWA architecture 700, a PCC 710 may send a path computation request to a first PCE 720, which may be configured for routing assignments. The first PCE 720 may perform path computation using path computation information from the PCC 710 and then send the computed paths and any RWA information in the path computation request to the second PCE 722, which may be configured for combined WA and IV.

The second PCE 722 may receive the computed paths and RWA information from the first PCE 720 and may have previous knowledge of shared impairment information, e.g. for a plurality of vendors' equipment. The second PCE 722 may also request additional impairment information, such as non-shared impairment information for any additional vendor's equipment. Thus, the second PCE 722 may perform combined WA and IV using the RWA information and the impairment information. The second PCE 722 may use a single, or a plurality of, processors to perform the combined WA and IV. The second PCE 722 may perform approximated IV or detailed IV to validate the computed paths. Further, the second PCE 722 may perform IV before WA. As such, the second PCE 722 may generate first a list of candidate and valid paths, e.g. based on the computed paths, and then perform WA. Alternatively, the second PCE 722 may perform WA before IV, where wavelengths may be assigned to the computed paths and then each path may be validated based on impairment information. Since the IV process is wavelength dependent, combining WA and IV in the second PCE 722 may improve the computation efficiency in the system. The final list of computed paths and assigned wavelengths may then be sent to the PCC 710 via the second PCE 722 or the first PCE 720.

In an alternative embodiment, the second PCE 722 may receive the path computation request from the PCC 710 and generate a list of validated paths and assigned wavelengths, which may be sent to the first PCE 720. The first PCE 720 may then compute a plurality of paths and associated wavelengths based on the information from the first PCE 722. Finally, the computed and validated paths and associated wavelengths may be sent to the PCC 710, via any of the PCEs.

Figure 8:
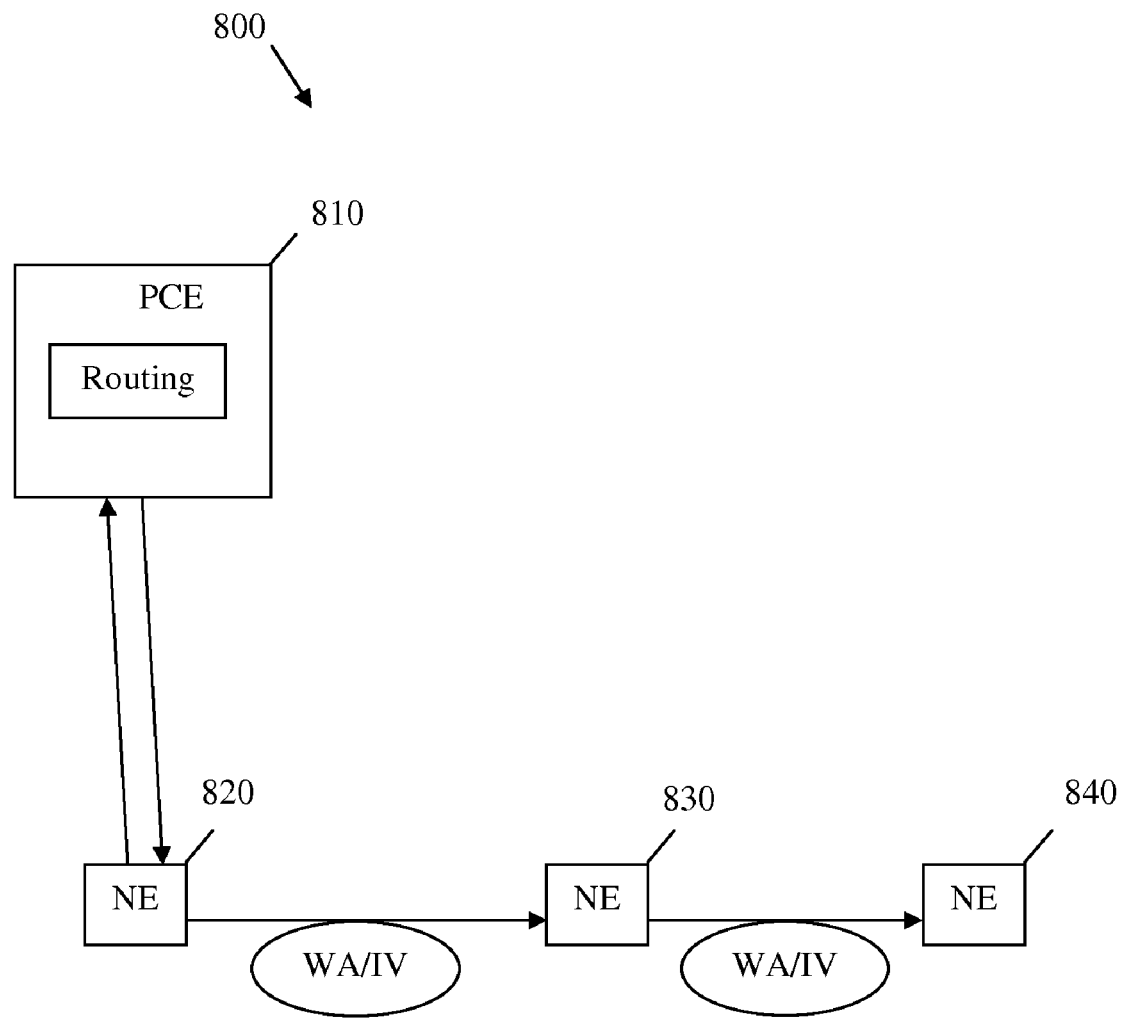
FIG. 8 is a schematic diagram of an embodiment of a distributed impairment aware RWA architecture.

FIG. 8 illustrates an embodiment of a distributed IA-RWA architecture 800. In the distributed IA-RWA architecture 800, a PCE 810 may receive some or all of the RWA information from the NEs 820, 830, and 840, perhaps via direct link, and perform the routing assignment. The PCE 810 then directly or indirectly passes the routing assignment to the individual NEs 820, 830, and 840, which may then perform distributed WA and IV (WA/IV) at the local links between the NEs 820, 830, and 840, e.g. based on local information.

For instance, the NE 820 may receive local RWA information from the NEs 830 and 840 and send some or all of the RWA information to the PCE 810. The PCE 810 may compute the lightpaths using the received RWA information and send the list of lightpaths to the NE 820. The NE 820 may use the list of lightpaths to identify the NE 830 as the next NE in the lightpath. The NE 820 may establish a link to the NE 830, e.g. via a signaling protocol, and use the received local RWA information that may comprise additional constraints to assign a wavelength for transmission over the link. Additionally, the NE 820 may use local impairment information to perform IV and generate a list of validated lightpaths. The list of validated paths may correspond to a plurality of wavelengths, which may be specified by the PCE 810 or indicated in the RWA information. The NE 820 may perform approximated IV for at least some of the wavelengths based on approximated models and measures, which may be carried through and accumulated along a path, e.g. using GMPLS or GMPLS resource reservation protocol (RSVP). For example, the NE 820 may perform IV based on a measure of signal quality, e.g. BER or OSNR, which may be accumulated along the path by the subsequent nodes.

The NE 830 may receive the list of lightpaths and the wavelengths from the NE 820, and use the list of lightpaths to identify the NE 840 as the next NE in the lightpath. Hence, the NE 830 may establish a link to the NE 840 and assign the same or a different wavelength for transmission over the link. The NE 830 may also use the same impairment information used by the node 820 and/or other local impairment information to perform IV and update the list of validated lightpaths and the associated wavelengths. The NE 830 may perform approximated IV based on the same approximated models and measures (e.g. BER, OSNR, etc.), which may be updated and further accumulated by the node 830. Similarly, the NE 840 may receive the list of lightpaths and wavelengths from the NE 830 and the impairment information, including the accumulated measures, from the node 840, update the received information, and propagate the information along the path.

Thus, the signals may be routed while the wavelengths are assigned and the lightpaths are validated in a distributed manner between the NEs until a destination node is reached. Assigning the wavelengths at the individual NEs may reduce the amount of RWA information and impairment information that may be forwarded between the NEs and between the NEs and the PCE 810. However, such distributed WA/IV schemes may require sharing some local and private impairment information between the NEs. Further, such signaling based schemes may become less practical as the quantity of computed paths and the available wavelengths increase.

At least some of the IA-RWA architectures described above may require changes in current protocols and/or standards, for example regarding the PCE, signaling, the information model, routing, or combinations thereof. Table 1 illustrates some aspects of the system that may require changes to support the IA-RWA architectures above.

TABLE 1

| IA-RWA Architecture | PCE | Signaling | Information Model | Routing |
|---|---|---|---|---|
| Combined IA-RWA architectures 200 | Yes | No | Yes | Yes |
| Combined IA-RWA architectures 300 | Yes | No | Yes | Yes |
| Combined IA-RWA architectures 400 | No | No | Yes | Yes |
| Combined IA-RWA architectures 500 | No | No | Yes | Yes |
| Combined IA-RWA architectures 600 | No | No | Yes | Yes |
| Combined IA-RWA architectures 700 | No | No | Yes | Yes |
| Combined IA-RWA architectures 800 | No | Yes | Yes | No |

Some of the impairment models, which may be used in the IA-RWA architectures above, may be described in ITU-T G.680. ITU-T G.680 includes some detailed and approximate impairment characteristics for fibers and various devices and subsystems. ITU-T G.680 also describes an integrated impairment model, which may be used to support IA-RWA, e.g. in the architectures above. However, the impairment characteristics and models in ITU-T G.680 are suitable for a network that comprises a line segment for a first vendor, which passes through a plurality of NEs (e.g. OADMs, PXCs, etc.) for a plurality of second vendors. The impairment information for the line segment may be private and the impairment information for the second vendors may be public. However, additional or different impairment models and impairment characteristics may be required for other network configurations, where a plurality of line segments or systems that correspond to a plurality of vendors may be deployed across the system.

For instance, in the case of a distributed IA-RWA architecture, such as the distributed IA-RWA architecture 800, an impairment information model and an impairment "computation model" may be needed to enable IV. Further, the accumulated impairment measures, which may be propagated and updated at a plurality of nodes along a path, may require standardization so that different nodes for different vendors in the same system may support IV. ITU-T G.680 may describe some impairment measures that may be used, such as computation formulas for OSNR, residual dispersion, polarization mode dispersion/polarization dependent loss, effects of channel uniformity, etc. However, ITU-T G.680 does not specify which measurements may be stored or maintained in the nodes and in what form.

The different IA-RWA architectures above may also use different path/wavelength impairment validation, which may impose different demands on routing. For instance, in the case where approximate impairment information is used to validate the paths, GMPLS routing may be used to distribute the impairment characteristics of the NEs and the links, e.g. based on an impairment information model. In the case of a distributed IA-RWA architecture, no changes to the routing protocol may be necessary, but substantial changes may be needed in the signaling protocol to enable IV. For instance, the characteristics of the transported signal in the distributed scheme, such as the signal modulation type, may affect system tolerance to optical impairments. Therefore, it may be advantageous to communicate such signal characteristics in the distributed scheme, e.g. via signaling.

Further, the different IA-RWA architectures above may comprise different PCE configurations, which may depend on the specific functionalities required for each architecture. For instance, in the case of the combined IA-RWA architecture 200, a single PCE (e.g. PCE 220) may perform all the computations needed for IA-RWA. As such, the PCE may be configured to maintain, e.g. in a TED, information about network (e.g. WSON) topology and switching capabilities, network WDM link wavelength utilization, and network impairment information. The PCE may also be configured to receive a path computation request from a PCC that may comprise a source node, a destination node, and a signal characteristic, type, and/or required quality. If the path computation is successful, the PCE may send a reply (or response) to the PCC that may comprise the computed path(s) and the assigned wavelength(s). Otherwise, if the path computation is not successful, the PCE may send a response to the PCC that indicates the reason that the path computation failed. For example, the response may indicate that the path computation failed due to lack of available wavelengths, due to impairment considerations, or both.

In the case of the separate IA-RWA architectures, such as the separate IA-RWA architecture 500, at least two PCEs (e.g. the PCE 520 and PCE 522) may perform the IV and RWA separately. One of the PCEs (e.g. PCE 522) may be configured to perform RWA computations and coordinate the overall IA-RWA process and the other PCE (e.g. PCE 520) may be configured to perform IV for candidate paths (IV-Candidate). The RWA PCE may interact with a PCC to receive path computation requests and with the IV-Candidates PCE to perform IV as needed and obtain a valid set of paths and wavelengths. The RWA PCE may also be configured to maintain, e.g. in a TED, information about network (e.g. WSON) topology and switching capabilities and about network WDM link wavelength utilization. However, the IV RWA PCE may not maintain impairment information.

The RWA PCE may also be configured to receive a path computation request from a PCC that may comprise a source node, a destination node, and a signal characteristic, type, and/or required quality. If the path computation is successful, the RWA PCE may send a reply (or response) to the PCC that may comprise the computed path(s) and the assigned wavelength(s). Otherwise, if the path computation is not successful, the RWA PCE may send a response to the PCC that indicates the reason that the path computation had failed. For example, the response may indicate that the path computation had failed due to lack of available wavelengths, due to impairment considerations, or both. Additionally, the RWA PCE may be configured to send a request to the IV-Candidates PCE to ask for K paths and acceptable wavelengths for the paths between the source node and the destination node in the PCC request. Accordingly, the RWA PCE may receive a reply (or response) from the IV-Candidates PCE, which may comprise at most K requested paths and associated wavelengths between the two nodes.

The IV-Candidates PCE may be configured for impairment aware path computation without necessarily the knowledge of current link wavelength utilization. The IV-Candidates PCE may interact with the RWA PCE, but not with the PCC, and may maintain, e.g. in a TED, information about network (e.g. WSON) topology and switching capabilities and network impairment information. However, the IV-Candidates PCE may not maintain network WDM link wavelength utilization. The combined IA-RWA architecture 400 is another IA-RWA architecture that may comprise a similarly configured IV-Candidates PCE.

Additionally or alternatively, one of the PCEs may be configured to perform detailed IV (IV-Detailed), such as in the separate IA-RWA architecture 600. The IV-Detailed PCE may maintain, e.g. in a TED, network impairment information and possibly information about WDM link wavelength utilization. To coordinate overall IA-RWA, the RWA PCE may send an IV request to the IV-Detailed PCE, which may comprise a list of paths and wavelengths and any signal characteristics and quality requirements. Thus, the IV-Detailed PCE may send back a reply (response) to the RWA PCE, which indicates whether the IV request was successfully/unsuccessfully met. For example, the reply may indicate a positive/negative decision (e.g. yes/no decision). If the IV request is not met, the IV-Detailed PCE may send a reply to the RWA PCE that indicates the reason that the IV request failed. Consequently, the RWA PCE may determine whether to try a different signal, e.g. by modifying a signal parameter or characteristic. The combined IA-RWA architecture 300 is another IA-RWA architecture that may comprise a similarly configured IV-Detailed PCE.

Figure 9:
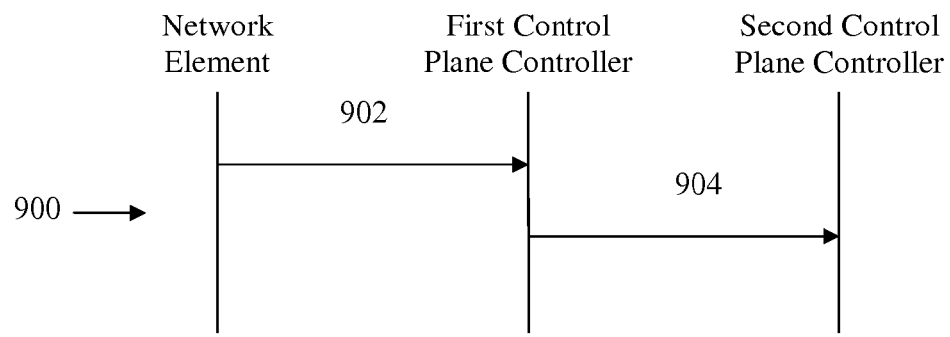
FIG. 9 is a protocol diagram of an embodiment of the communications between a NE, a first control plane controller, and a second control plane controller.

FIG. 9 illustrates an embodiment of a communication method 900 between a NE, a first control plane controller, and a second control plane controller, which may be an adjacent control plane controller. In some embodiments, the method 900 may occur between a NE, a first control plane controller, and the PCE, for example, when the first control plane controller sends the RWA information to the TED in the PCE. In the method 900, the first control plane controller obtains the RWA information 902 from at least one NE. The NE may send the RWA information 902 to the first control plane controller without prompting by the first control plane controller, or the NE may send the RWA information 902 to the first control plane controller in response to a request by the first control plane controller. The first control plane controller then sends a message 904 to the second control plane controller, where the message 904 comprises at least one of the RWA information described below. Specifically, the RWA information may be embodied in at least one TLV. As used herein, the term TLV may refer to any data structure that carries the RWA information. The message 904 and perhaps the TLV may also comprise a status indicator that indicates whether the RWA information is static or dynamic. In an embodiment, the status indicator may indicate how long the static or dynamic status lasts, so that the second control plane controller can know how long the RWA information is valid and/or when to expect an update. Additionally or alternatively, the message 904 and perhaps the TLV may comprise a type indicator that indicates whether the RWA information is associated with a node, a link, or both.

Figure 10:
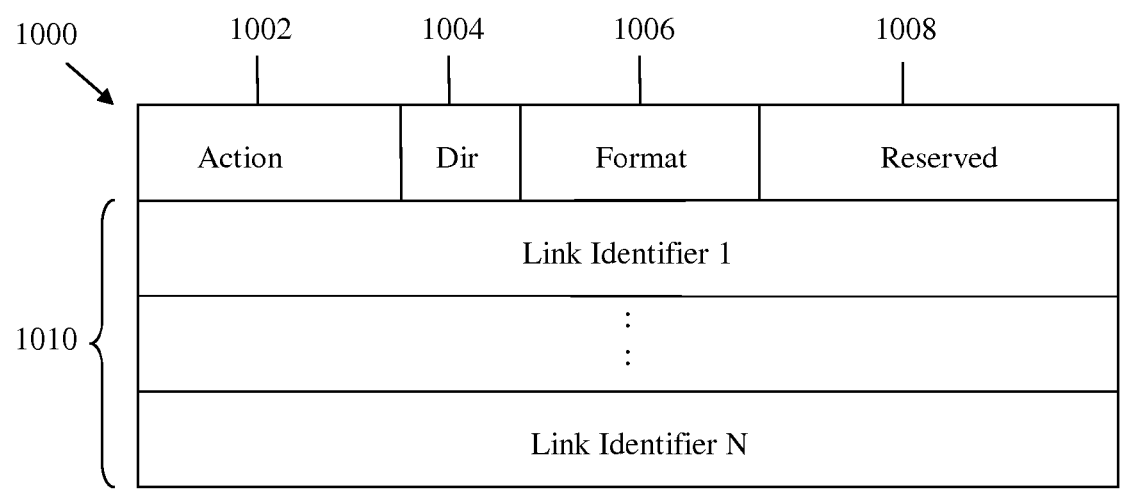
FIG. 10 is a schematic diagram of an embodiment of a link set TLV.

FIG. 10 illustrates one embodiment of a link set TLV 1000. The link set TLV 1000 may be used to encode at least one type of the RWA information discussed below when the RWA information is associated with at least one node and/or link. The link set TLV 1000 may comprise an action field 1002. The action field 1002 may comprise the first about eight bits of the TLV 1000, and may provide information regarding the link identifier(s) 1010. For example, when the action field 1002 is set to zero, the link identifier(s) 1010 may represent an inclusive list in that the links identified in the link identifier(s) 1010 are the only links in the link set. Similarly, when the action field 1002 is set to one, the link identifier(s) 1010 may represent an exclusive list in that the links identified in the link identifier(s) 1010 are the only links that are excluded from the link set. In contrast, when the action field 1002 is set to two, the link identifiers 1010 may represent an inclusive range in that the link set comprises the links identified in the link identifiers 1010 and any links there between. Moreover, when the action field 1002 is set to three, the link identifiers 1010 may represent an exclusive range in that the link set does not comprise the links identified in the link identifiers 1010 and any links there between. In some cases, the order of the link identifiers 1010 is unimportant such that the link identifiers 1010 may be arranged in any order.

The link set TLV 1000 may also comprise a directionality (Dir) field 1004, a format field 1006, a reserved field 1008, and at least one link identifier 1010. The Dir field 1004 may comprise the subsequent about two bits of the TLV 1000, and may indicate the directionality of the links in the link set. For example, the links may be bidirectional links when the Dir field 1004 is set to zero. Alternatively, the links may be ingress links when the Dir field 1004 is set to one, or the links may be egress links when the Dir field 1004 is set to two. The format field 1006 may comprise the subsequent about six bits of the TLV 1000, and may indicate the format of the link identifier 1010. For example, the format field 1006 may indicate the link identifier 1010 is formatted as a link local identifier when the format field 1006 is set to zero. The reserved field 1008 may comprise the subsequent about 16 bits of the TLV 1000, and may be used for other purposes. At least one link identifier 1010 may be included in the TLV 1000, where each link identifier 1010 is about 32 bits in length and identifies a particular link for the purposes described herein, e.g. inclusive lists, exclusive lists, inclusive ranges, or exclusive ranges.

Figure 11:
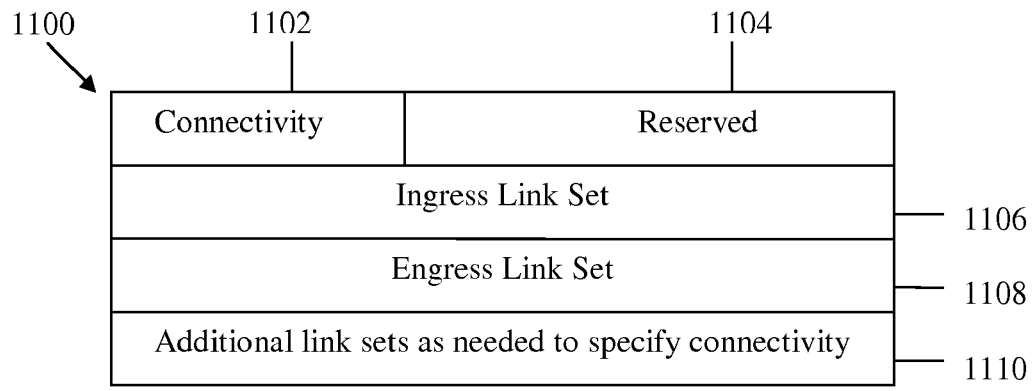
FIG. 11 is a schematic diagram of an embodiment of a connectivity matrix TLV.

FIG. 11 illustrates an embodiment of a connectivity matrix TLV 1100. The TLV 1100 may be used to indicate the connectivity matrix described above. The TLV 1100 comprises a connectivity field 1102, a reserved field 1104, at least one ingress link set 1106, at least one egress link set 1108, and optionally additional link sets 1110. The connectivity field 1102 may comprise the first about seven bits of the TLV 1100, and may indicate the reconfigurability of a network element. For example, the connectivity field 1102 may be set to zero when the network element is fixed and may be set to one when the network element is reconfigurable, as is the case with a ROADM or OXC. The reserved field 1104 may be the subsequent about 24 bits of the TLV 1100, and may be used for other purposes. Each ingress link set 1106 may be variable in length, and may be one of the link sets described above. Specifically, the ingress link set 1106 may specify the ingress links for the node. Each egress link set 1108 may be variable in length, and may be one of the link sets described above. Specifically, the ingress link set 1106 may specify the egress links for the node. The optional additional link sets 1110 may be variable in length, may be one of the link sets described above, and may specify any additional links. In some cases, the order of the ingress link set 1106, the egress link set 1108, and the optional additional link sets 1110 is unimportant such that the link sets may be arranged in any order.

The connectivity matrix TLV 1100 may be better understood by applying it to a two-degree, 40-channel ROADM as an example. The ROADM may have one line side ingress port, one line side egress port, 40 add ports, and 40 drop ports. The ports may be numbered and identified according to the link to which they are connected, such that the line side ingress port can be identified by link local identifier #1, the 40 add ports can be identified by link local identifiers #2-#41, the egress line side port can be identified by link local identifier #42, and the 40 drop ports can be identified by link local identifiers #43-#82. Within the ROADM, the line side ingress port may be connected to the line side egress port and to all of the drop ports. Similarly, the add ports may be connected to the line side egress port, but not any of the drop ports.

Figure 12:
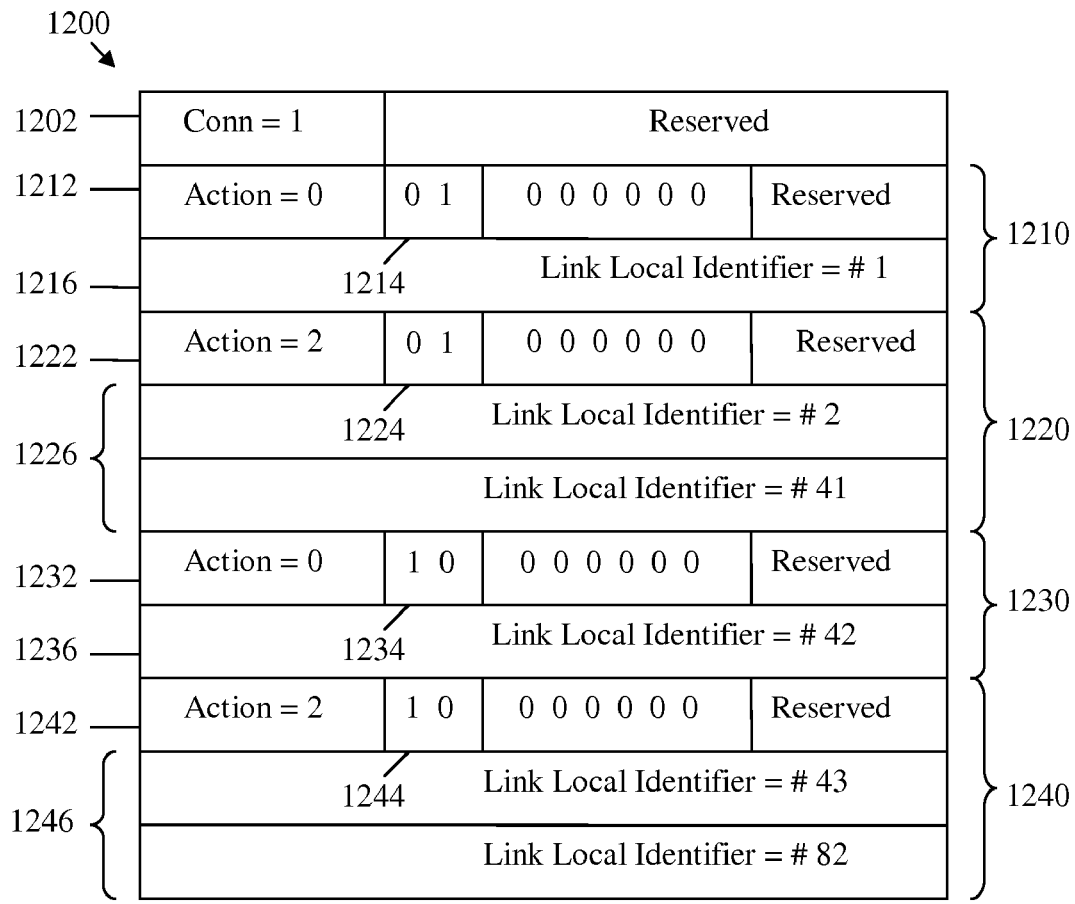
FIG. 12 is a schematic diagram of another embodiment of the connectivity matrix TLV.

FIG. 12 illustrates an example of the connectivity matrix TLV 1200 for the ROADM described above. The TLV 1200 is similar to the TLV 1100 described above and uses the link set TLVs 600 described above for the ingress link sets and the egress link sets. Specifically, the connectivity field 1202 is set to one, which may indicate that the network element, e.g. the ROADM, is reconfigurable. The TLV 1200 also comprises four link sets: a first ingress link set 1210, a second ingress link set 1220, a first egress link set 1230, and a second egress link set 1240. Turning to the first ingress link set 1210, the action field 1212 is set to zero, which may indicate that the first ingress link set 1210 represents an inclusive list. In addition, the Dir field 1214 in the first ingress link set 1210 is set to one, which may indicate that the first ingress link set 1210 represents ingress ports. Finally, the link identifier 1216 within the first ingress link set 1210 identifies link number 1. Thus, the first ingress link set 1210 may identify the first link set in the reconfigurable device as being a single ingress port, namely port #1. Turning to the second ingress link set 1220, the action field 1222 is set to two, which may indicate that the second ingress link set 1220 represents an inclusive range. In addition, the Dir field 1224 in the second ingress link set 1220 is set to one, which may indicate that the second ingress link set 1220 represents ingress ports. Finally, the link identifiers 1226 within the second ingress link set 1220 identify link numbers 2 and 41. Thus, the second ingress link set 1220 may identify the second link set in the reconfigurable device as being forty ingress ports, namely ports #2-#41.

Turning to the first egress link set 1230, the action field 1232 is set to zero, which may indicate that the first egress link set 1230 represents an inclusive list. In addition, the Dir field 1234 in the first egress link set 1230 is set to two, which may indicate that the first egress link set 1230 represents egress ports. Finally, the link identifier 1236 within the first egress link set 1230 identifies link number 42. Thus, the first egress link set 1230 may identify the third link set in the reconfigurable device as being a single egress port, namely port #42. Turning to the second egress link set 1240, the action field 1242 is set to two, which may indicate that the second egress link set 1240 represents an inclusive range. In addition, the Dir field 1244 in the second egress link set 1240 is set to two, which may indicate that the second egress link set 1240 represents egress ports. Finally, the link identifiers 1246 within the second egress link set 1240 identify link numbers 43 and 82. Thus, the second egress link set 1240 may identify the fourth link set in the reconfigurable device as being forty egress ports, namely ports #43-#82.

In an embodiment, the RWA information may include a wavelength range. The wavelength range, which may also be referred to as the WDM link or fiber wavelength range, may indicate how many different wavelengths a link or port can simultaneously accept, the range of wavelengths that the link or port can accept, or both. For example, the wavelength range may be multiple wavelengths selected from a full range of wavelengths, which may indicate that the node or link can accept a plurality of wavelengths simultaneously and is colorless in that it has no limitations on which wavelengths it can accept. Alternatively, the wavelength range may be a single wavelength selected from a full range of wavelengths, which may indicate that the node or link can accept only one wavelength at a time, but is colorless in that it has no limitations on which wavelength it can accept. Further in the alternative, the wavelength range may be a single, fixed wavelength, which may indicate that the node or link can accept only one wavelength at a time and is colored or colorful in that it is limited to a single wavelength. Moreover, the wavelength range may be multiple wavelengths selected from a reduced range of wavelengths, which may indicate that the node or link can accept a plurality of wavelengths simultaneously and is limited in the wavelengths it can accept, similar to wave band switching. Specifically, the node or link may be limited to a plurality of individual, discrete wavelengths or may be limited to a reduced range of wavelengths. The wavelength range may be static in that wavelength range that a node or link can accept does not typically change once the node or link is installed in the network. It will be appreciated that the wavelength range for a node may be the same for the entire node or may vary from port to port. In addition, the wavelength ranges for the node or for a node's port may be independent of and perhaps different from the wavelength ranges for the link that is coupled an individual port on the node. Finally, the message may contain the wavelength range for each node, each node's ports, each fiber, or combinations thereof within the network.

As previously mentioned, some optical impairment parameters may exhibit a frequency dependence that needs to be accounted for over the frequency/wavelength of the system. In at least some embodiments, an extensible encoding of such dependence takes into account general purpose interpolation methods such as linear interpolation, cubic splines, etc., as well as application specific interpolation methods such as the 3-term and 5-term Sellmeier formulas of Appendix A of ITU-T G.650.1. The following considerations are used in the encoding of frequency dependency: 1) each parameter in a group of parameters will have its own interpolation data, where the "type" of the parameter identifies how many sub-parameters are in the group; 2) interpolation data may be broken into sub-ranges of validity for a formula with particular interpolation coefficients; 3) the type of interpolation to be used over the sub-ranges must be specified; and 4) the assumption that each sub-range will make use of the same type of interpolation formula (unless this condition is too limiting).

Figure 13:
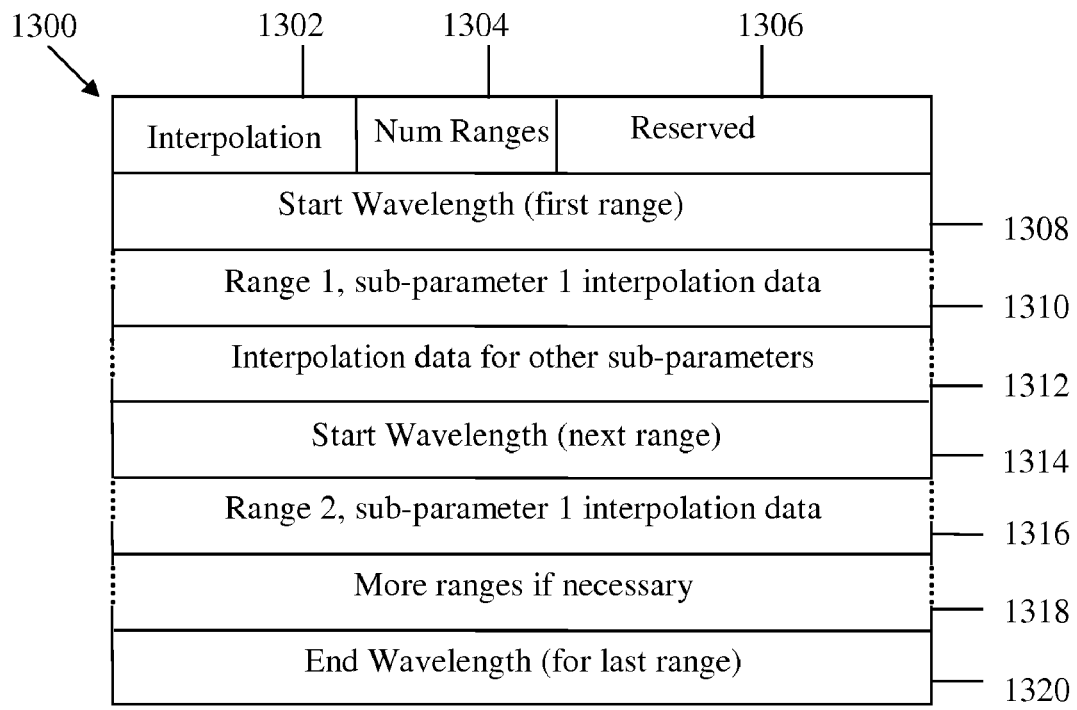
FIG. 13 is a schematic diagram for an optical parameter frequency dependence encoding.

FIG. 13 is a schematic diagram 1300 of an optical parameter frequency dependence encoding. As shown, the frequency dependence encoding of schematic diagram 1300 comprises an "interpolation" field 1302, a "num ranges" field 1304, and a "reserved" field 1306, which form a header for the frequency dependence encoding. The "interpolation" field 1302 indicates the type of interpolation to be used across a frequency range for the parameter. For example, a "0" value may correspond to a piecewise constant interpolation, where a single interpolation value for the parameter is used across each sub-range. Meanwhile, a "1" value may correspond to a linear interpolation, where two interpolation values for the parameter are given corresponding to the interpolation value at each end of a frequency sub-range. Linear interpolation is used to obtain the parameter values for frequencies between the sub-range limits. Other interpolation types may be available and used herein.

The "num ranges" field 1304 provides an integer to indicate the number of sub-ranges for the interpolation. The "reserved" field 1306 corresponds to reserved bits. In at least some embodiments, the "interpolation" field 1302 comprises a byte (8 bits) of data, the "num ranges" field 1304 comprises a byte (8 bits) of data, and the "reserved" field 1306 comprises 2-bytes (16 bits) of data.

Following the header (fields 1302, 1304, 1306), the optical parameter frequency dependence encoding of schematic diagram 1300 comprises the frequency ranges and interpolation data of at least one parameter or sub-parameter. As shown, field 1308 indicates a start range of a first interpolation range. Field 1310 indicates interpolation data for a sub-parameter corresponding to the start range of field 1308. Field 1312 indicates interpolation data for another sub-parameter corresponding to the start range of field 1308. At field 1314, another frequency range for interpolation data of at least one parameter or sub-parameter begins. Field 1316 indicates interpolation data for a sub-parameter corresponding to the start range of field 1314. In the schematic diagram 1300, block 1318 corresponds to additional frequency ranges and/or interpolation data. Finally, field 1320 indicates an end wavelength corresponding to the end of the last frequency range with interpolation data for at least one parameter or sub-parameter. In at least some embodiments, each of the fields 1308, 1310, 1312, 1314, 1316, 1318, and 1320 comprise 4-bytes (32 bits) of data. In the case of "no interpolation," a sub-parameter value is assumed to be valid over the entire sub-range and no additional interpolation-related parameters or coefficients are needed.

In at least some embodiments, network element wide parameters are provided for path computation and/or optical path impairment validation. For these network element wide parameters, IEEE 754-2008 format 32 bit floating point numbers may be used with the units being specified. In some embodiments, these network element wide parameters are explicitly identified via a code point mechanism. Table 2 shows various network element wide parameters with unit and range information.

TABLE 2

| Parameter | Unit | Range |
| --- | --- | --- |
| Channel frequency range | GHz | Min, Max |
| Channel insertion loss deviation | dB | Max |
| Ripple | dB | Max |
| Channel chromatic dispersion | ps/nm | Min, Max |
| Differential group delay | ps | Max |
| Polarization dependent loss | dB | Max |
| Reflectance (passive component) | dB | Max |
| Reconfigure time/Switching time | ms | Min, Max |
| Channel uniformity | dB | Max |
| Channel addition/removal (steady-state) gain response | dB | Min, Max |
| Transient duration | ms | Max |
| Transient gain increase | dB | Max |

TABLE 2-continued

| Parameter | Unit | Range |
| --- | --- | --- |
| Transient gain reduction | dB | Max |
| Multichannel gain-change difference (inter-channel gain-change difference) | dB | Max |
| Multichannel gain tilt (inter-channel gain-change ratio) | dB | Max |

As shown in Table 2, for each parameter, unit information and range information may be provided. If the range of a parameter is "Max", only the maximum value for the parameter is given (e.g., a 32 bit IEEE floating point number). If the range of a parameter is "Min, Max," the minimum value and the maximum value of the parameter are given (e.g., two 32 bit IEEE floating point numbers). It should be understood that not necessarily all the parameters of Table 2 are required for path computation and/or optical path impairment validation. Further, some of the parameters are frequency dependent while others are not. For example, channel insertion loss deviation and channel chromatic dispersion may be frequency dependent. In such case, the optical parameter frequency dependence encoding of FIG. 13 may be implemented for each of these parameters.

In accordance with at least some embodiments, per port parameters may be considered within the category of link parameters that are typically disseminated by a link state protocol. Since many optical ports on a device tend to have the same parameters, grouping these parameters together for conveyance is logical and may aid in interpretation. For example, in a high channel count ROADM with many add and drop ports, the characteristics of all the add ports would tend to be similar to each other. However, the drop ports would tend to be different from each other and the trunk (or through) ports. Accordingly, at least some embodiments provide an optional encoding scheme based on grouping common per port parameters along with a Link Set TLV or sub-TLV to specify the set of links that share the same port parameters.

Figure 14:
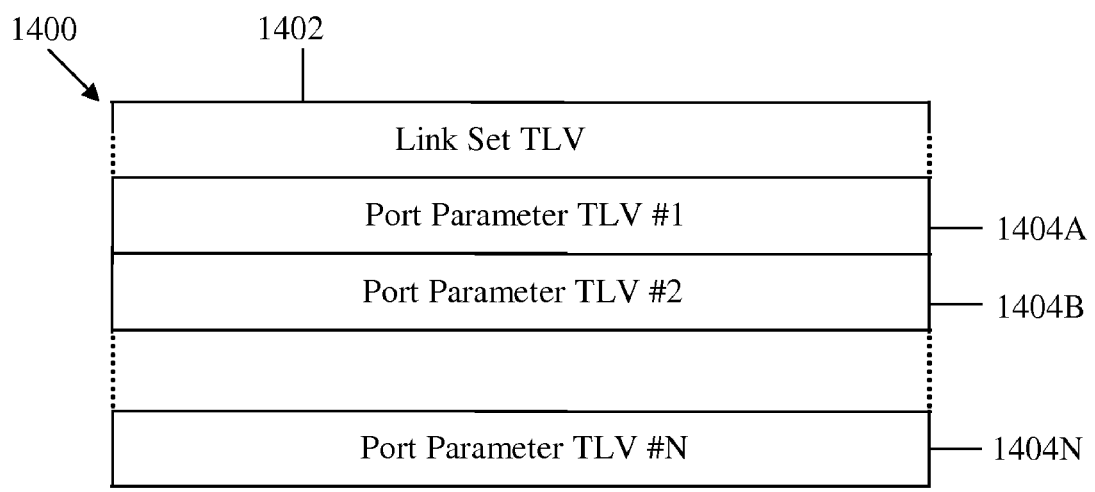
FIG. 14 is a schematic diagram of a link set TLV encoding for port parameters.

FIG. 14 is a schematic diagram 1400 of an embodiment of a link set TLV encoding for port parameters. As shown in the schematic diagram 1400, a plurality of port parameter TLVs 1404A-1404N are aggregated to a link set TLV 1402. In at least some embodiments, per port parameters are provided for path computation and/or optical path impairment validation. For these per port parameters, IEEE format 32 bit floating point numbers may be used with the units being specified. In some embodiments, these per port parameters are explicitly identified via a code point mechanism. Table 3 shows various per port parameters with unit and range information.

TABLE 3

| Parameter | Unit | Range |
| --- | --- | --- |
| Total input power range | dBm | Min, Max |
| Channel input power range | dBm | Min, Max |
| Channel output power range | dBm | Min, Max |
| Input reflectance (with amplifiers) | dB | Max |
| Output reflectance (with amplifiers) | dB | Max |
| Maximum reflectance tolerable at input | dB | Min |
| Maximum reflectance tolerable at output | dB | Min |
| Maximum total output power | dBm | Max |

As shown in Table 3, for each parameter, unit information and range information may be provided. If the range of a parameter is "Max", only the maximum value for the parameter is given (e.g., a 32 bit IEEE floating point number). If the range of a parameter is "Min," only the minimum value for the parameter is given (e.g., a 32 bit IEEE floating point number). If the range of a parameter is "Min, Max," the minimum value and the maximum value of the parameter are given (e.g., two 32 bit IEEE floating point numbers). It should be understood that not necessarily all the parameters of Table 3 are required for path computation and/or optical path impairment validation.

In accordance with at least some embodiments, port-to-port parameters are provided for path computation and/or optical path impairment validation. To specify port-to-port parameters the corresponding port pair related to the parameters needs to be specified. In some embodiments, there may be a large number of port pairs with some of these port pairs having the same parameter values. In such cases, the port pairs with the same parameter values may be grouped when encoding port-to-port parameters. For example, the specification data for a simple ROADM may give the insertion loss for the "through to drop ports" as a single parameter, along with a separate insertion loss parameter for the "add to through ports."

Figure 15:
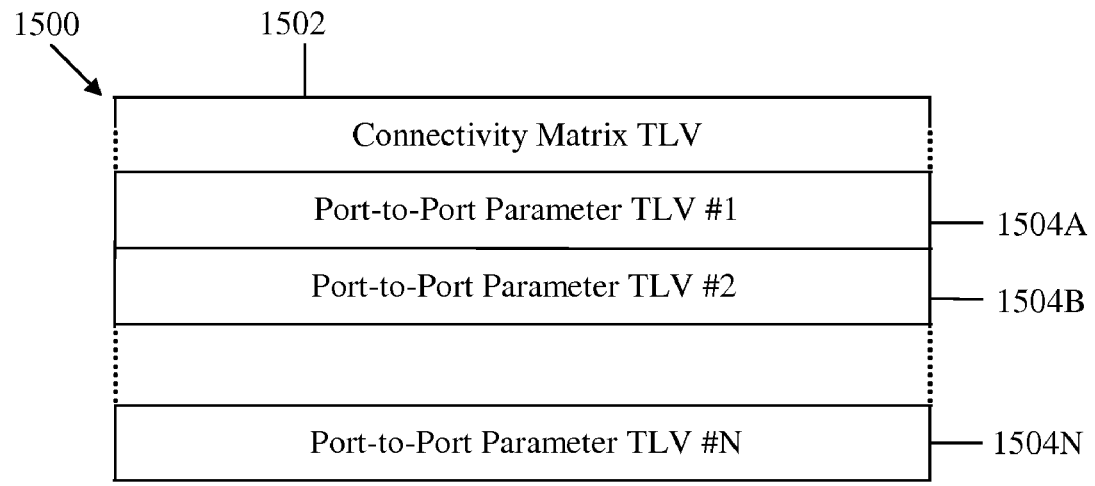
FIG. 15 is a schematic diagram of a connectivity matrix TLV encoding for port-to-port parameters.

In accordance with at least some embodiments, port-to-port parameters may be considered within a Connectivity Matrix TLV or sub-TLV, which is essentially a compact listing of ingress-egress port pairs. FIG. 15 is a schematic diagram 1500 of an embodiment of a connectivity matrix TLV encoding for port-to-port parameters. As shown in the schematic diagram 1500, a plurality of port-to-port parameter TLVs 1504A-1504N are aggregated to a connectivity matrix TLV 1502. In at least some embodiments, the port-to-port parameters are provided for path computation and/or optical path impairment validation. For these port-to-port parameters, IEEE format 32 bit floating point numbers may be used with the units being specified. In some embodiments, these port-to-port parameters are explicitly identified via a code point mechanism. Table 4 shows various port-to-port parameters with unit and range information.

TABLE 4

| Parameter | Unit | Range |
| --- | --- | --- |
| Insertion loss | dB | Min, Max |
| Isolation, adjacent channel | dB | Min |
| Isolation, non-adjacent channel | dB | Min |
| Channel extinction | dB | Min |
| Channel signal-spontaneous noise figure | dB | Max |
| Channel gain | dB | Min, Max |

As shown in Table 4, for each parameter, unit information and range information may be provided. If the range of a parameter is "Max", only the maximum value for the parameter is given (e.g., a 32 bit IEEE floating point number). If the range of a parameter is "Min," only the minimum value for the parameter is given (e.g., a 32 bit IEEE floating point number). If the range of a parameter is "Min, Max," the minimum value and the maximum value of the parameter are given (e.g., two 32 bit IEEE floating point numbers). It should be understood that not necessarily all the parameters of Table 4 are required for path computation and/or optical path impairment validation. Further, some of the parameters are frequency dependent while others are not. For example, insertion loss, channel extinction, channel signal spontaneous noise figure, and channel gain may be frequency dependent. In such case, the optical parameter frequency dependence encoding of FIG. 13 may be implemented for each of these parameters.

Figure 16:
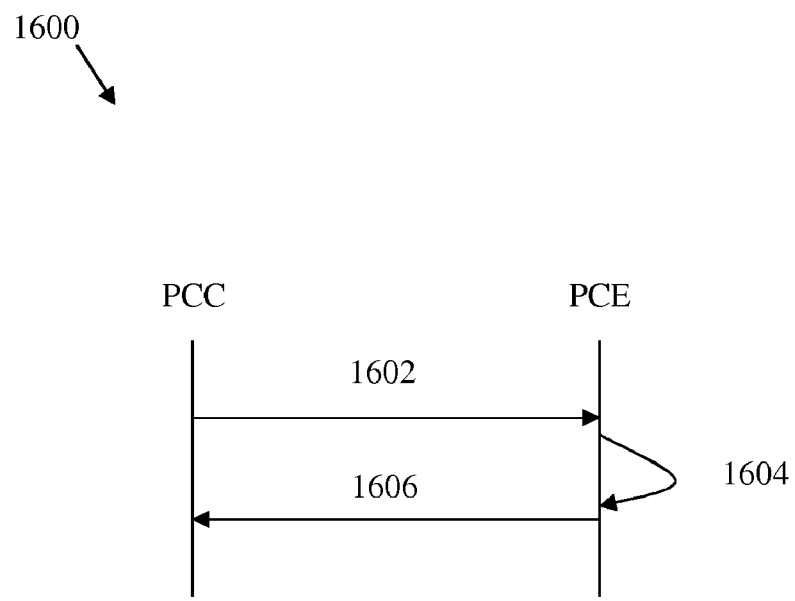
FIG. 16 is a protocol diagram of an embodiment of a path computation communication method.

FIG. 16 illustrates an embodiment of a path computation communication method 1600 between a PCC and a PCE. The PCE may be configured for combined IA-RWA, such as in combined IA-RWA architecture 200. The method 1600 may be implemented using any suitable protocol, such as the PCEP. In the method 1600, the PCC may send a path computation request 1602 to the PCE. The request may comprise path computation information and path computation constraints. For example, the path computation information may comprise RWA information, including wavelength constraints, and possibly required impairment information. Further, the path computation information may comprise parameter dependence information as in FIG. 13, network element wide parameters, per port parameters as in FIG. 14, and port-to-port information as in FIG. 15. At 1604, the PCE calculates a path through the network, which may be based on the path computation information and meet the path computation constraints. For example, the PCE may perform RWA and IV based on the RWA information and the impairment information. The PCE may then send a path computation reply 1606 to the PCC. The reply 1606 may comprise the IA-RWA.

Figure 17:
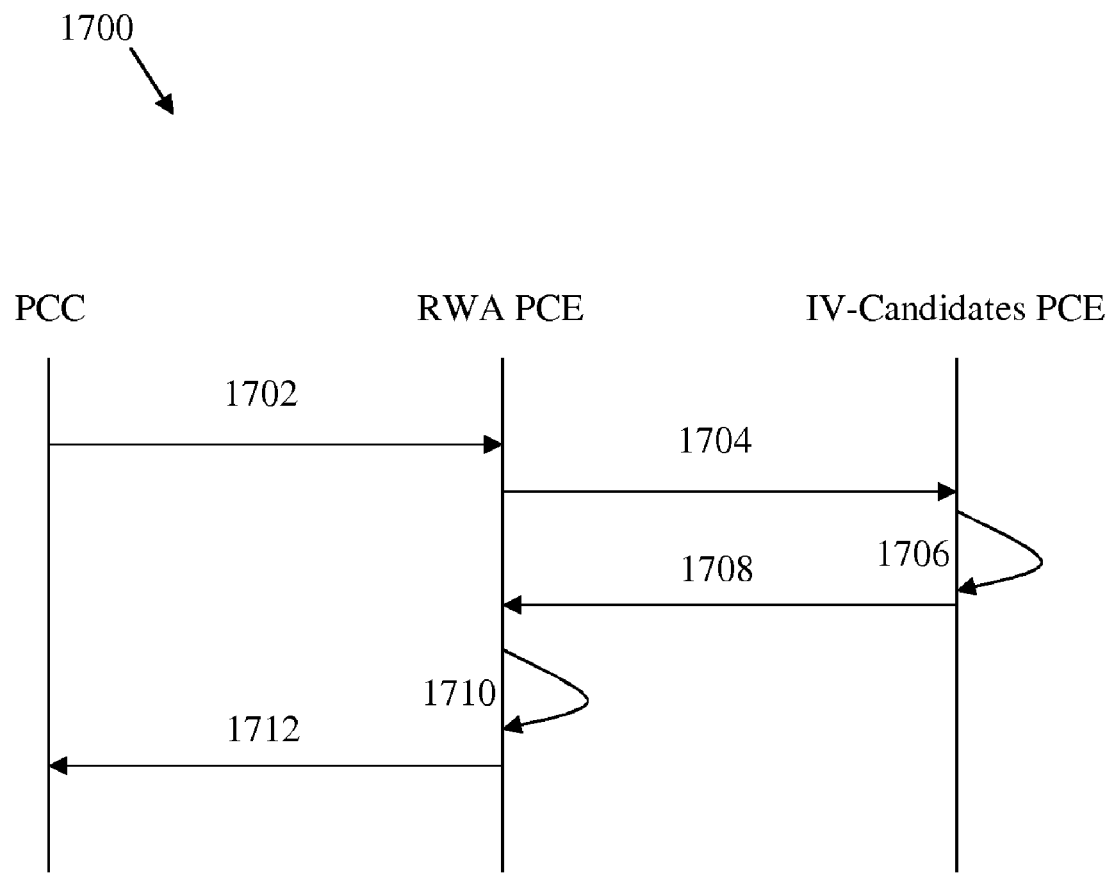
FIG. 17 is a protocol diagram of another embodiment of a path computation communication method.

FIG. 17 illustrates an embodiment of a path computation communication method 1700 between a PCC and at least two PCEs or computation entities. The two PCEs may be configured for separate RWA and IV, such as in the separate IA-RWA architecture 500 and the separate IA-RWA architecture 400. The method 1700 may be implemented using any suitable protocol, such as the PCEP. In the method 1700, the PCC may send a path computation request 1702 to the RWA PCE. The request may comprise path computation information and path computation constraints. For example, the path computation information may comprise RWA information, including wavelength constraints. The path computation constraints may comprise quality constraints, e.g. between a first node (source node) and a second node (destination node), for a signal that may be represented by a specified type (or a class) and associated parameters. Further, the path computation information may comprise parameter dependence information as in FIG. 13, network element wide parameters, per port parameters as in FIG. 14, and port-to-port information as in FIG. 15. The RWA PCE may send an IV request 1704 to the IV PCE, which may be an IV-Candidates PCE. As such, the RWA PCE may ask for K paths and acceptable wavelengths for the paths between the two nodes indicated in the PCC request.

At 1706, the IV-Candidates PCE may perform IV, e.g. using approximate techniques/models, to obtain a list of validated paths and associated wavelengths. The IV-Candidates PCE may then send a reply 1708, which comprises the list of paths and wavelengths, to the RWA PCE. At 1710, the RWA PCE may perform RWA using the information from the IV-Candidates PCE and the received path computation information/constraints. The RWA PCE may then send a path computation reply 1712 to the PCC, which may comprise the IA-RWA.

Figure 18:
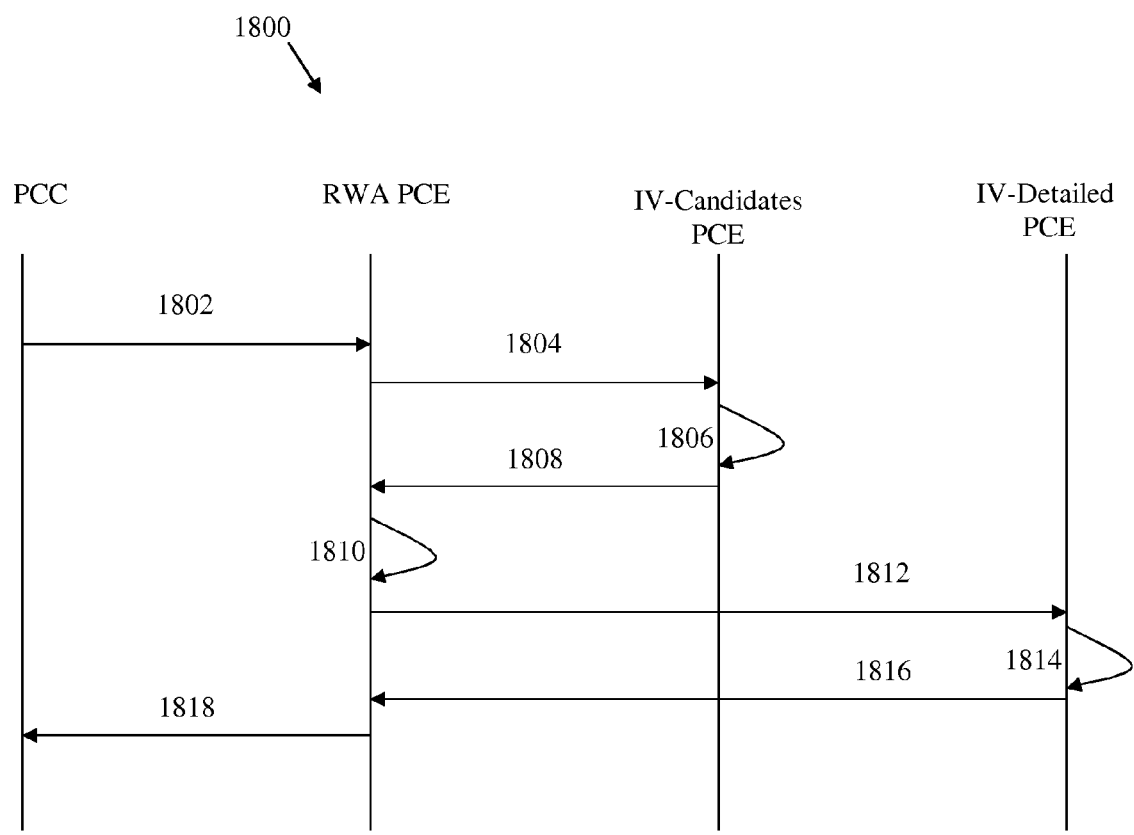
FIG. 18 is a protocol diagram of another embodiment of a path computation communication method.

FIG. 18 illustrates an embodiment of a path computation communication method 1800 between a PCC and a plurality of PCEs or computation entities. The PCEs may be configured for separate RWA and IV-Candidates and IV-Detailed processes, such as in the separate IA-RWA architecture 600 and the combined IA-RWA architecture 300. The method 1800 may be implemented using any suitable protocol, such as the PCEP. In the method 1800, the steps 1802, 1804, 1806, 1808, and 1810 between the PCC, the RWA PCE, and the IV-Candidates PCE may be configured substantially similar to the corresponding steps in the method 1700.

In step 1810 of the method 1800, the RWA PCE obtains the IA-RWA calculations. However, before sending the IA-RWA to the PCC, the PC RWA may send an IV request 1812 to the IV-Detailed PCE. As such, the RWA PCE may request a detailed verification of the calculated paths and assigned wavelengths from the IV-Detailed PCE. At 1814, the IV-Detailed PCE may perform IV, e.g. using detailed techniques/ models, to validate the computed paths and corresponding wavelengths. The IV-Detailed PCE may then send a reply 1816 to the RWA PCE, to confirm or reject each computed path. The RWA PCE may update the list of paths and wavelengths based on the reply from the IV-Detailed PCE and then send a reply 1818 to the PCC, which may comprise the final IA-RWA.

When a network comprises a plurality of PCEs, not all the PCEs within the network may have the ability to perform IA-RWA or RWA. Therefore, the network may comprise a discovery mechanism that allows the PCC to determine the PCE in which to send the request, e.g. request 1602, 1702, or 1802. For example, the discovery mechanism may comprise an advertisement from a PCC for an IA-RWA capable PCE or RWA capable PCE, and a response from the PCEs indicating whether they have such capability. The discovery mechanism may be implemented as part of the methods 1600, 1700, and 1800 or as a separate process.

Figure 19:
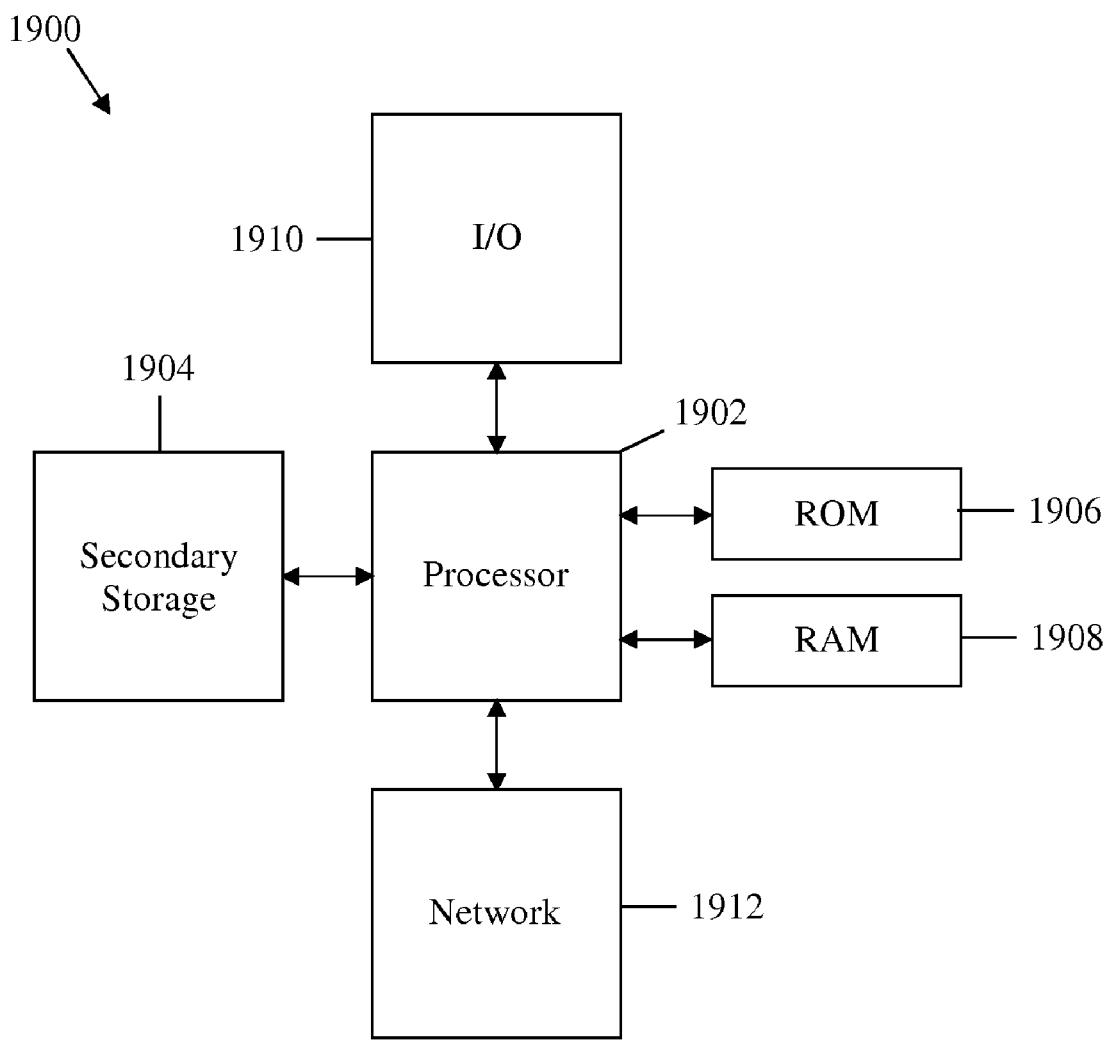
FIG. 19 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 19 illustrates a typical, general-purpose network component suitable for implementing one or more embodiments of the components disclosed herein. The network component 1900 includes a processor 1902 (which may be referred to as a central processor unit or CPU) that is in communication with memory devices including secondary storage 1904, read only memory (ROM) 1906, random access memory (RAM) 1908, input/output (I/O) devices 1910, and network connectivity devices 1912. The processor may be implemented as one or more CPU chips, or may be part of one or more application specific integrated circuits (ASICs).

The secondary storage 1904 is typically comprised of one or more disk drives or tape drives and is used for non-volatile storage of data and as an over-flow data storage device if RAM 1908 is not large enough to hold all working data. Secondary storage 1904 may be used to store programs that are loaded into RAM 1908 when such programs are selected for execution. The ROM 1906 is used to store instructions and perhaps data that are read during program execution. ROM 1906 is a non-volatile memory device that typically has a small memory capacity relative to the larger memory capacity of secondary storage 1904. The RAM 1908 is used to store volatile data and perhaps to store instructions. Access to both ROM 1906 and RAM 1908 is typically faster than to secondary storage 1904.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   at least one processor configured to implement a method comprising:
   transmitting a message to at least one adjacent control plane controller,
   wherein the message comprises a Type-Length-Value (TLV) having a plurality of parameters,
   wherein the message comprises frequency dependency information for each of the parameters that is frequency dependent.

2. The network component of claim 1, wherein the message comprises a minimum value and a maximum value for each of the parameters that correspond to a ranged parameter.

3. The network component of claim 2, wherein the TLV comprises at least one ranged parameter selected from the group consisting of ranged network element wide parameters, ranged port parameters, and ranged port-to-port parameters.

4. The network component of claim 2, wherein the TLV comprises at least one ranged parameter selected from the group consisting of a channel frequency range parameter, a channel chromatic dispersion parameter, a total input power range parameter, a channel input power range parameter, a channel output power range parameter, an insertion loss parameter, and a channel gain parameter.

5. The network component of claim 1, wherein the frequency dependency information for at least one of the parameters indicates that interpolation is not used for a frequency range.

6. The network component of claim 1, wherein the frequency dependency information for at least one of the parameters indicates an interpolation type for each of a plurality of frequency sub-ranges.

7. The network component of claim 1, wherein the TLV comprises at least one network element wide parameter that is frequency dependent.

8. The network component of claim 7, wherein the at least one network element wide parameter is selected from the group consisting of a channel chromatic dispersion parameter and a channel insertion loss deviation parameter.

9. The network component of claim 1, wherein the TLV comprises at least one port-to-port parameter provided by a connectivity matrix TLV or sub-TLV.

10. The network component of claim 9, wherein the at least one port-to-port parameter is a frequency dependent parameter selected from the group consisting of an insertion loss parameter, a channel extinction parameter, a channel signal-spontaneous noise figure parameter, and a channel gain parameter.

11. The network component of claim 1, wherein the TLV comprises port parameters provided by a link set TLV or sub-TLV.

12. A method comprising:
    communicating a message comprising a Type-Length-Value (TLV) to a control plane controller,
    wherein the TLV comprises a plurality of parameters and frequency dependency information for each of the parameters that is frequency dependent.

13. The method of claim 12 further comprising encoding the frequency dependency information in the TLV as:

a header that indicates an interpolation type and a number of frequency sub-ranges;
a start wavelength field for each sub-range; and
interpolation data for each sub-range.

14. The method of claim 12 further comprising encoding each ranged parameter of the parameters in the TLV with a minimum value and a maximum value.

15. The method of claim 12 further comprising encoding each port parameter of the parameters in the TLV using a link set TLV or sub-TLV.

16. The method of claim 12 further comprising encoding each port-to-port parameter of the parameters in the TLV using a matrix connectivity TLV or sub-TLV.

17. An apparatus comprising:
a control plane controller configured to communicate a Type-Length-Value (TLV) to at least one adjacent control plane controller,
wherein the TLV indicates a plurality of parameters and frequency dependency information for each of the parameters that is frequency dependent.

18. The apparatus of claim 17, wherein the control plane controller is configured to encode each ranged parameter of the parameters in the TLV with a minimum value and a maximum value.

19. The apparatus of claim 17, wherein the control plane controller is configured to encode each port parameter of the parameters in the TLV using a link set TLV or sub-TLV.

20. The apparatus of claim 17, wherein the control plane controller is configured to encode each port-to-port parameter of the parameters in the TLV using a matrix connectivity TLV or sub-TLV.

* * * * *

UNITED STATES PATENT AND TRADEMARK OFFICE
CERTIFICATE OF CORRECTION

PATENT NO.        : 8,208,405 B2
APPLICATION NO.   : 12/708046
DATED             : June 26, 2012
INVENTOR(S)       : Young Lee and Greg Bernstein It is certified that error appears in the above-identified patent and that said Letters Patent is hereby corrected as shown below:

Column 24, line 9, claim 1 should read, "A network component comprising: at least one processor that encodes a message; and a transmitter that transmits the message to at least one adjacent control plane controller; wherein the message comprises a Type-Length-Value (TLV) having a plurality of parameters, wherein the message comprises frequency dependency information for each of the parameters that is frequency dependent, and wherein the frequency dependent parameter comprises an impairment characteristic of a network element (NE) that varies based on the frequency of a signal passing through the NE."

Column 25, line 60, claim 12 should read, "A method comprising: communicating, using a network element (NE), a message comprising a Type-Length-Value (TLV) to a control plane controller, wherein the TLV comprises a plurality of parameters and frequency dependency information for each of the parameters that is frequency dependent, and wherein the frequency dependent parameter comprises an impairment characteristic of a NE that varies based the frequency of an optical signal passing through the NE."

Column 25, line 14, claim 17 should read, "An apparatus comprising: a control plane controller comprising: a processor to encode a Type-Length-Value (TLV); and a transmitter to transmit the TLV to at least one adjacent control plane controller; wherein the TLV indicates a plurality of parameters and frequency dependency information for each of the parameters that is frequency dependent, and wherein the frequency dependent parameter comprises an impairment characteristic of a network element (NE) that varies based the frequency of an optical signal passing through the NE."

Signed and Sealed this
Sixteenth Day of October, 2012

David J. Kappos
*Director of the United States Patent and Trademark Office*